US010812721B2

(12) United States Patent
Honsho et al.

(10) Patent No.: US 10,812,721 B2
(45) Date of Patent: Oct. 20, 2020

(54) IMAGING ELEMENT DRIVING DEVICE, METHOD FOR MANUFACTURING IMAGING ELEMENT DRIVING DEVICE, AND IMAGING DEVICE

(71) Applicant: PANASONIC INTELLECTUAL PROPERTY MANAGEMENT CO., LTD., Osaka (JP)

(72) Inventors: Hironori Honsho, Hyogo (JP); Hiroki Aono, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 16/273,409

(22) Filed: Feb. 12, 2019

(65) Prior Publication Data
US 2019/0174044 A1 Jun. 6, 2019

Related U.S. Application Data

(63) Continuation of application No. PCT/JP2018/010131, filed on Mar. 15, 2018.

(30) Foreign Application Priority Data

Mar. 22, 2017 (JP) .................................. 2017-055247

(51) Int. Cl.
H04N 5/232 (2006.01)
G03B 5/00 (2006.01)
(Continued)

(52) U.S. Cl.
CPC ............. H04N 5/2327 (2013.01); G03B 5/00 (2013.01); H04N 5/2253 (2013.01);
(Continued)

(58) Field of Classification Search
CPC ............. H04N 5/2327; H04N 5/23287; H04N 5/2253; H04N 5/3745; G03B 5/00;
(Continued)

(56) References Cited

U.S. PATENT DOCUMENTS

2007/0274168 A1* 11/2007 Kimura ................ G11B 7/0933
369/44.11
2008/0048652 A1 2/2008 Murakita
(Continued)

FOREIGN PATENT DOCUMENTS

JP 2007-178723 A 7/2007
JP 2008-020704 A 1/2008
(Continued)

OTHER PUBLICATIONS

Partial Supplementary European Search Report dated Nov. 28, 2019, in corresponding European Patent Application No. 18771991.9.
(Continued)

Primary Examiner — Timothy J Henn
(74) Attorney, Agent, or Firm — McDermott Will & Emery LLP

(57) ABSTRACT

The sensor magnets have, on a side facing the attraction plate: an S1 magnetized portion magnetized to an S pole; an N2 magnetized portion located at a position adjacent to the S1 magnetized portion in an L1 direction, and magnetized to an N pole; an S3 magnetized portion located at a position adjacent to the N2 magnetized portion in an L2 direction intersecting the L1 direction, and magnetized to the S pole; and an N4 magnetized portion located at a position adjacent to the S3 magnetized portion in an L3 direction intersecting the L2 direction and adjacent to the S1 magnetized portion, and magnetized to the N pole. The attraction plate overlaps at least part of the S1 magnetized portion, the N2 magne-
(Continued)

tized portion, the S3 magnetized portion, and the N4 magnetized portion, when viewed in an optical axis direction.

16 Claims, 13 Drawing Sheets

(51) Int. Cl.
*H04N 5/3745* (2011.01)
*H04N 5/225* (2006.01)
(52) U.S. Cl.
CPC ....... *H04N 5/23287* (2013.01); *H04N 5/3745* (2013.01); *G03B 2205/0015* (2013.01)
(58) Field of Classification Search
CPC .... G03B 2205/0015; G03B 2205/0038; G03B 2205/0069; G02B 27/646
See application file for complete search history.

(56) References Cited

U.S. PATENT DOCUMENTS

| | | | |
|---|---|---|---|
| 2008/0225126 A1* | 9/2008 | Mogamiya | H04N 5/2253 348/208.4 |
| 2010/0315184 A1* | 12/2010 | Morimoto | G11B 7/22 335/209 |
| 2011/0188841 A1 | 8/2011 | Ohno | |
| 2012/0020653 A1 | 1/2012 | Shintani | |
| 2012/0200176 A1* | 8/2012 | Park | H04N 5/2254 310/12.16 |
| 2013/0021685 A1* | 1/2013 | Fan | G03B 3/10 359/824 |
| 2013/0038758 A1 | 2/2013 | Imade | |
| 2013/0088607 A1 | 4/2013 | Akutsu et al. | |
| 2013/0300336 A1* | 11/2013 | Ishikawa | H02P 25/034 318/610 |
| 2014/0212118 A1* | 7/2014 | Shimoyama | H04N 5/23287 396/55 |
| 2014/0293073 A1 | 10/2014 | Okamura et al. | |
| 2014/0375829 A1* | 12/2014 | Nishihara | H04N 5/23287 348/208.7 |
| 2014/0379103 A1* | 12/2014 | Ishikawa | G05B 15/02 700/56 |
| 2015/0070115 A1 | 3/2015 | Okamura et al. | |
| 2016/0072998 A1* | 3/2016 | Yazawa | H01F 7/06 348/208.7 |
| 2017/0155816 A1* | 6/2017 | Ito | H04N 5/2328 |
| 2017/0244898 A1 | 8/2017 | Shintani | |

FOREIGN PATENT DOCUMENTS

| | | |
|---|---|---|
| JP | 2010-015107 A | 1/2010 |
| JP | 2010-073035 A | 4/2010 |
| JP | 2011-227578 A | 11/2011 |
| JP | 2012-048215 A | 3/2012 |
| JP | 2013-083753 A | 5/2013 |
| JP | 2014-137380 A | 7/2014 |
| JP | 2015-055795 A | 3/2015 |
| JP | 2015-121572 A | 7/2015 |
| JP | 2016-109889 A | 6/2016 |
| JP | 2017-021101 A | 1/2017 |
| WO | 2017/145205 A1 | 8/2017 |

OTHER PUBLICATIONS

International Search Report and Written Opinion dated Jun. 19, 2018 in International (PCT) Application No. PCT/JP2018/010131; with partial English translation.

* cited by examiner

IMAGING ELEMENT DRIVING DEVICE, METHOD FOR MANUFACTURING IMAGING ELEMENT DRIVING DEVICE, AND IMAGING DEVICE

CROSS REFERENCE TO RELATED APPLICATIONS

This application is a U.S. continuation application of PCT International Patent Application Number PCT/JP2018/010131 filed on Mar. 15, 2018, claiming the benefit of priority of Japanese Patent Application Number 2017-055247 filed on Mar. 22, 2017, the entire contents of which are hereby incorporated by reference.

BACKGROUND

1. Technical Field

The present disclosure relates to an imaging element driving device, a method for manufacturing an imaging element driving device, and an imaging device.

2. Description of the Related Art

Conventionally, imaging devices have widely been used which have, for the purpose of acquiring a clear captured image, mechanisms for correcting a blur of an optical image upon capturing an image (hereinafter referred to as "image blur correction mechanisms").

Such image blur correction mechanisms include image blur correction mechanisms of optical type and image blur correction mechanisms of image element driving type. Image blur correction mechanisms of optical type drive part or all of optical lenses in a plane perpendicular to an optical axis or in a direction tilted with respect to the optical axis for correction (for example, see Japanese Unexamined Patent Application Publication No. 2013-83753). Image blur correction mechanisms of image element driving type drive an imaging element in a plane perpendicular to an optical axis for correction (for example, see Japanese Unexamined Patent Application Publication No. 2012-48215).

Moreover, imaging devices that drive an imaging element in a plane perpendicular to an optical axis in a minimum pixel unit to obtain an image of high resolution from a plurality of pieces of image data are known (for example, see Japanese Unexamined Patent Application Publication No. 2010-73035).

Further, imaging devices that drive an imaging element in a plane perpendicular to an optical axis with a pitch shorter than a minimum pixel unit to obtain an image of higher resolution from a plurality of pieces of image data are known (for example, see Japanese Unexamined Patent Application Publication No. 2011-227578).

SUMMARY

The present disclosure provides an imaging element driving device, a method for manufacturing an imaging element driving device, and an imaging device that can stably drive an imaging element.

An imaging element driving device according to an aspect of the present disclosure An imaging element driving device that drives an imaging element, the imaging element driving device including: a fixed frame; a movable frame that is used to hold the imaging element, faces the fixed frame in an optical axis direction, and is displaceable in a plane orthogonal to the optical axis direction with respect to the fixed frame; a magnetic body that is provided on one of the fixed frame and the movable frame; and at least one magnet that is provided on an other one of the fixed frame and the movable frame, and faces the magnetic body in the optical axis direction, wherein the at least one magnet has, on a side facing the magnetic body: an S1 magnetized portion magnetized to an S pole; an N2 magnetized portion located at a position adjacent to the S1 magnetized portion in a first direction, and magnetized to an N pole; an S3 magnetized portion located at a position adjacent to the N2 magnetized portion in a second direction intersecting the first direction, and magnetized to the S pole; and an N4 magnetized portion located at a position adjacent to the S3 magnetized portion in a third direction intersecting the second direction and adjacent to the S1 magnetized portion, and magnetized to the N pole, and the magnetic body overlaps at least part of the S1 magnetized portion, the N2 magnetized portion, the S3 magnetized portion, and the N4 magnetized portion, when viewed in the optical axis direction.

The imaging element driving device and the like according to an aspect of the present disclosure can stably drive an imaging element.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

DETAILED DESCRIPTION OF THE EMBODIMENT

Figure 1:
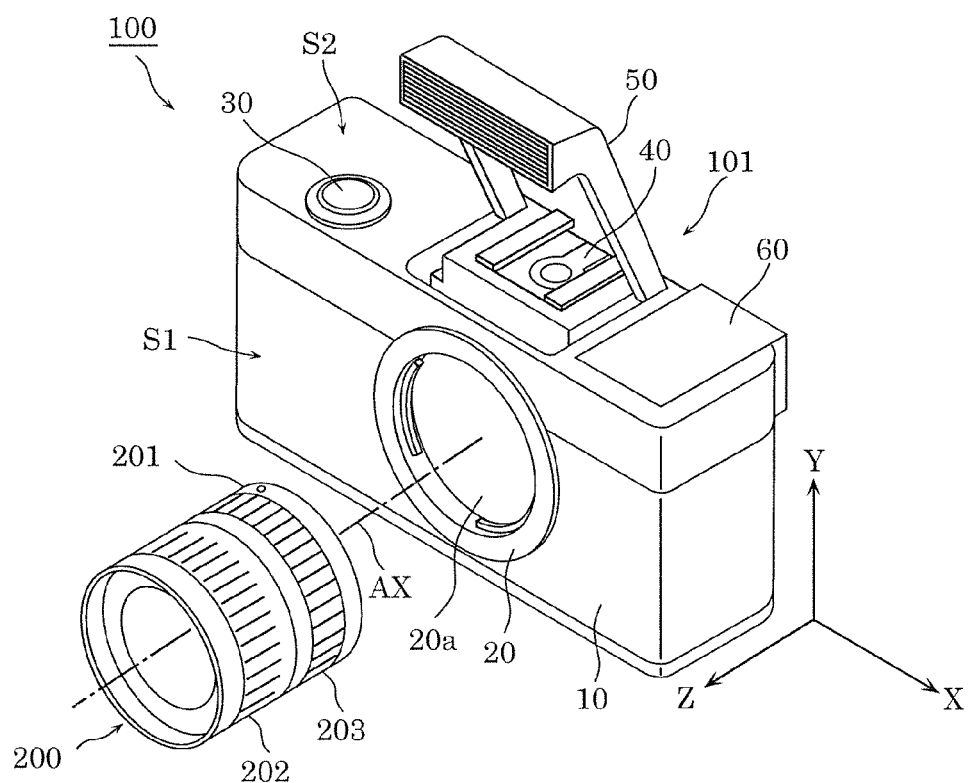
FIG. 1 is a perspective view of a digital camera according to an embodiment.

Underlying Knowledge Forming Basis of the Present Disclosure

The inventors found out that the techniques described in the "BACKGROUND ART" section have the following problems.

An imaging device (for example, a digital camera) provided with an image blur correction mechanism of image element driving type includes an imaging element and an imaging element driving device for driving the imaging element. The imaging element driving device includes a fixed frame, a movable frame two-dimensionally displaceable in a plane orthogonal to an optical axis with respect to the fixed frame, and an actuator for displacing the movable frame with respect to the fixed frame. The imaging element is attached to the movable frame, and is displaceable, along with the movable frame, with respect to the fixed frame. The imaging device calculates the displacement direction and the displacement amount of the imaging element in the plane from an output of an angular velocity sensor provided in the body of the imaging device, and, based on the calculated displacement direction and displacement amount, corrects a blur of a subject image formed on the imaging element by a photographing lens.

Herein, the displacement amount of the imaging element is the amount of movement of the imaging element in the plane orthogonal to the optical axis from a reference position (position of the imaging element that is not displaced) in the plane.

The movable frame is supported by the fixed frame so as to be displaceable, through a rolling bearing composed of at least three ball members. A force (drawing force) for biasing the movable frame toward the fixed frame through the ball members is thus required. Examples of a mechanism for applying this drawing force include a configuration using a tension spring and a configuration using magnetic attraction.

With the configuration using a tension spring, the force of the spring increases according to the displacement amount of the imaging element, so that not only the drawing force for biasing the movable frame toward the fixed frame but also the force in the direction opposite to the displacement direction of the imaging element increases. In addition, with the configuration using a tension spring, static contact between the movable frame and the fixed frame cannot be avoided, as a result of which friction between the movable frame and the fixed frame caused by the displacement of the movable frame adversely affects actuator control.

With the configuration using magnetic attraction, the drawing force decreases according to the displacement amount of the imaging element, contrary to the configuration using a tension spring, and the same level of force as the force by the tension spring is generated in the direction opposite to the displacement direction of the imaging element. Therefore, both configurations have a problem in that actuator control is very complex.

The actuator includes a yoke and a plurality of magnets fixed to the yoke. The following two magnet fixing methods have been conventionally used. The first method forms a hole in the yoke beforehand, and pours an adhesive into the gaps between the yoke and the magnets in contact with the yoke through the hole. The second method temporarily places the magnets on the yoke to position the magnets relative to the yoke, and then pours an adhesive into the gaps between the magnets and the yoke from the corners of the magnets.

However, the first method has a problem in that, because the hole needs to be formed in the yoke, the volume of the yoke decreases by the hole, and the magnetic force to the coils decreases. The second method has a problem in that, because a space for pouring the adhesive from the corners of the magnets needs to be secured on the yoke, the size of the actuator increases, The present disclosure is based on such knowledge, and the inventors conceived, as a result of intensive study, an imaging element driving device, a method for manufacturing an imaging element driving device, and an imaging device that can stably drive an imaging element.

An embodiment will be described in detail below, by referring to drawings as appropriate. Herein, description detailed more than necessary may be omitted. For example, detailed description of well-known matters or repeated description of the substantially same structures may be omitted. This is to avoid unnecessarily redundant description and facilitate the understanding of a person skilled in the art.

The accompanying drawings and the following description are provided to help a person skilled in the art to fully understand the present disclosure, and are not intended to limit the subject matter defined in the appended claims.

In the embodiment described below, a digital camera is used as an example of the "imaging device". In the following description, the terms "front (Z-axis positive direction)", "back (Z-axis negative direction)", "up (Y-axis positive direction)", "down (Y-axis negative direction)", "right (X-axis negative direction)", and "left (X-axis positive direction)" are used based on the imaging device that faces a subject in a landscape orientation, where the subject side is "front" and the side opposite to the subject (i.e. photographer side) is "back". Moreover, a rotation direction around the Y axis (up-down direction) is referred to as "pitch direction", a rotation direction around the X axis (right-left direction) as "yaw direction", and a rotation direction around the Z axis as "roll direction".

Embodiment

1. Structure

[1-1. Schematic Structure of Digital Camera]

Figure 2:
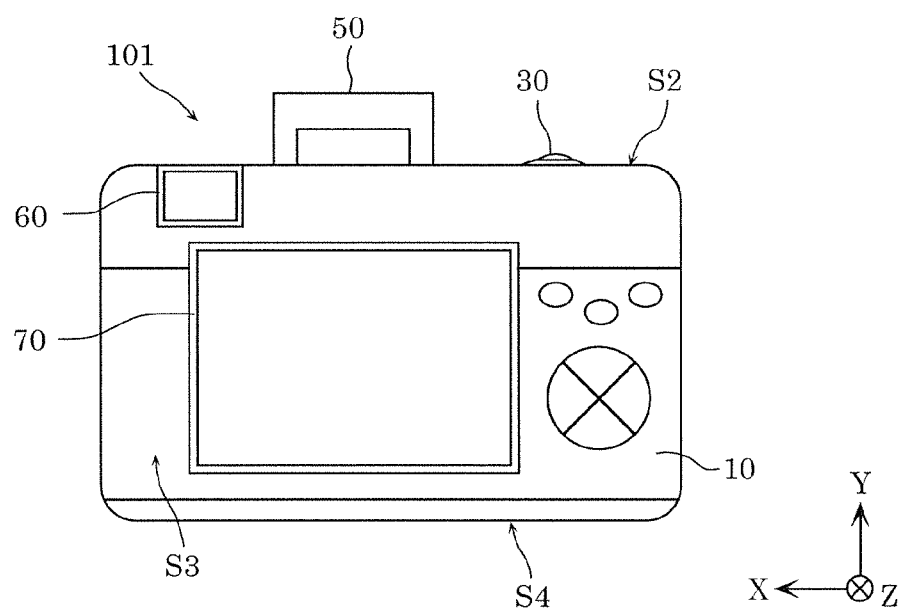
FIG. 2 is a back view of the digital camera according to the embodiment.

The schematic structure of digital camera 100 (an example of the imaging device) according to Embodiment 1 will be described below, with reference to FIGS. 1 and 2. FIG. 1 is a perspective view of digital camera 100 according to the embodiment. FIG. 2 is a back view of digital camera 100 according to the embodiment.

Digital camera 100 includes camera body 101 (an example of the imaging device) and lens unit 200 (an example of the imaging device), as illustrated in FIGS. 1 and 2. Digital camera 100 is, for example, a lens interchangeable digital camera.

Camera body 101 includes housing 10, body mount 20, shutter button 30, hot shoe 40, flash emitter 50, electronic viewfinder 60, and display device 70, as illustrated in FIGS. 1 and 2.

Housing 10 stores image blur correction device 1 (see FIG. 3) and the like. Housing 10 has front surface S1, upper surface S2, back surface S3, and lower surface S4. Body mount 20 is provided on front surface S1 of housing 10. Lens unit 200 can be attached to body mount 20 by means of bayonet connection or the like. Body mount 20 has opening 20a around optical axis AX of lens unit 200. Optical axis AX is an axis parallel to the Z axis. Incident light from lens unit 200 is guided into housing 10 through opening 20a. Shutter button 30 is mounted on upper surface S2 of housing 10. Shutter button 30 receives an open/close operation of a shutter from a photographer (user).

Hot shoe 40 is provided on upper surface S2 of housing 10. A general-purpose external component (such as a flash emission device, etc.) can be attached to hot shoe 40. Flash emitter 50 is provided on upper surface S2 of housing 10. Flash emitter 50 can be stored in housing 10. FIGS. 1 and 2 illustrate the state in which flash emitter 50 is pulled out of housing 10. Electronic viewfinder 60 is provided on back surface S3 of housing 10. Electronic viewfinder 60 displays an image in the photographing range. The photographer can observe an image displayed on electronic viewfinder 60. Display device 70 is provided on back surface S3 of housing 10. Display device 70 displays an image in the photographing range, an operation menu, and the like. Examples of usable display device 70 include a liquid crystal display, an organic electroluminescence (EL) display, and an inorganic EL display.

Camera body 101 also includes a shutter unit (not illustrated), image blur correction device 1 (an example of the imaging element driving device) (see FIG. 3), imaging element 12 (see FIG. 6), circuit board 13 (see FIG. 5), and a control circuit board (not illustrated). These components are arranged inside housing 10. Imaging element 12 is composed of a complementary metal oxide semiconductor (CMOS) image sensor or a charge-coupled device (CCD) image sensor, for example.

Although this embodiment describes the case where digital camera 100 is a lens interchangeable digital camera, digital camera 100 is not limited to such. For example, digital camera 100 may be a lens integrated digital camera or a single-lens reflex digital camera.

Lens unit 200 is an interchangeable lens unit, as illustrated in FIG. 1. Lens unit 200 includes lens mount 201 mounted on body mount 20 of camera body 101, focus ring 202 serving as an operation unit for driving a focus lens, and zoom ring 203 serving as an operation unit for driving a zoom lens. Lens unit 200 also includes inside a lens controller, an optical system including the focus lens and the zoom lens, a focus lens driver, a zoom lens driver, a diaphragm, a diaphragm driver, a dynamic random access memory (DRAM), and a flash memory, although not illustrated.

Light from a subject enters camera body 101 through the optical system inside of lens unit 200, and is received by the light-receiving surface of imaging element 12. The optical image received by imaging element 12 is converted into an electric signal, that is, image data. The image data is subjected to predetermined processes (for example, analog/digital (AD) conversion) by circuit board 13, and then displayed on display device 70 by the control circuit board. Circuit board 13 includes a controller for executing a predetermined program stored in a non-volatile memory such as a read only memory (ROM), and a RAM used for temporary storage during control operation and image processing operation. The controller is implemented by, for example, a central processing unit (CPU), a micro processing unit (MPU), a digital signal processor (DSP), a field programmable gate array (FPGA), or an application specific integrated circuit (ASIC).

[1-2. Schematic Structure of Image Blur Correction Device]

The schematic structure of image blur correction device 1 according to the embodiment will be described below, with reference to FIGS. 3 to 7B.

Figure 3:
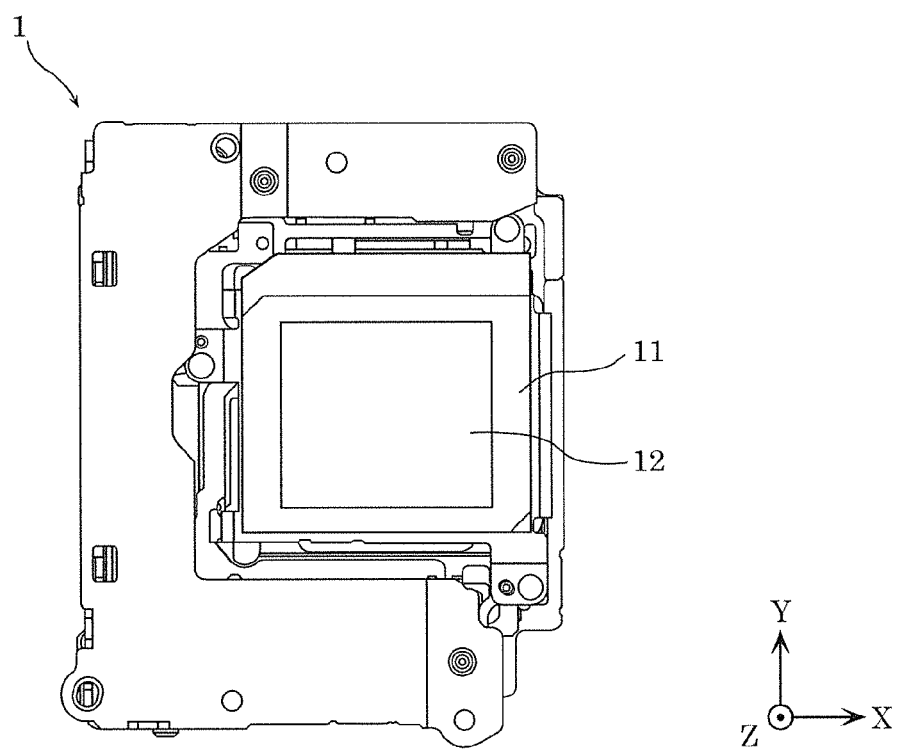
FIG. 3 is a front view of an image blur correction device according to the embodiment.
Figure 4:
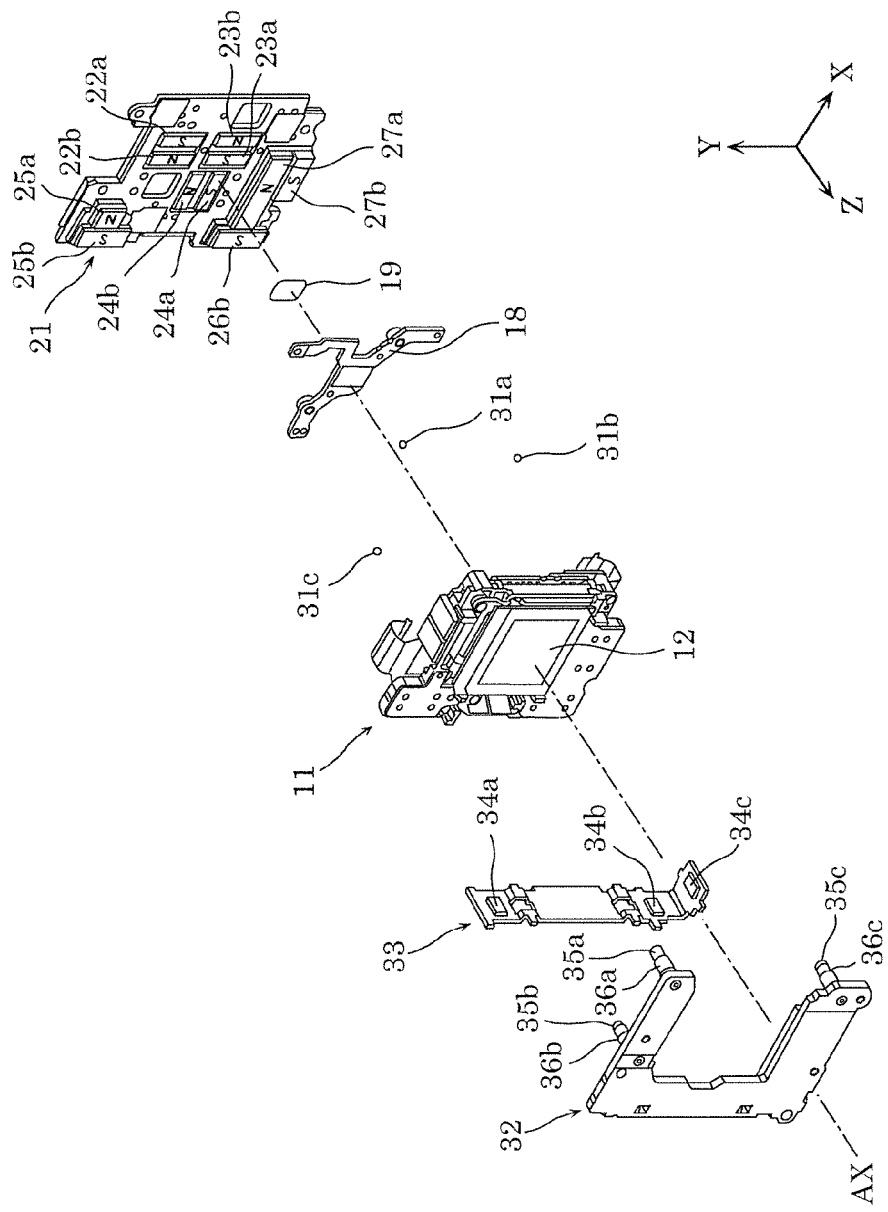
FIG. 4 is an exploded perspective view of the image blur correction device according to the embodiment.
Figure 5:
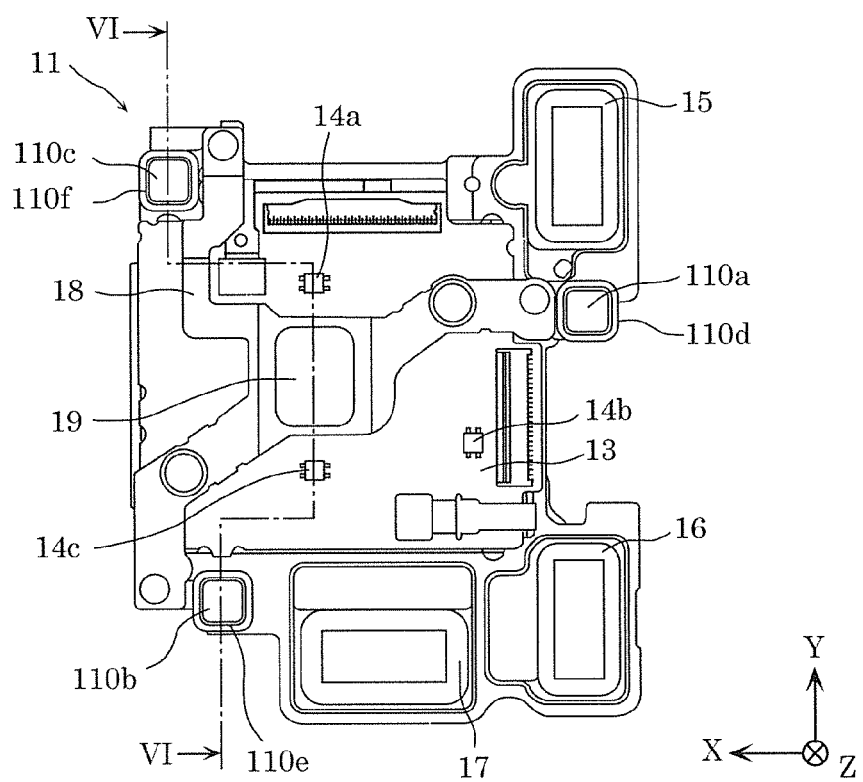
FIG. 5 is a back view of a movable frame according to the embodiment.
Figure 6:
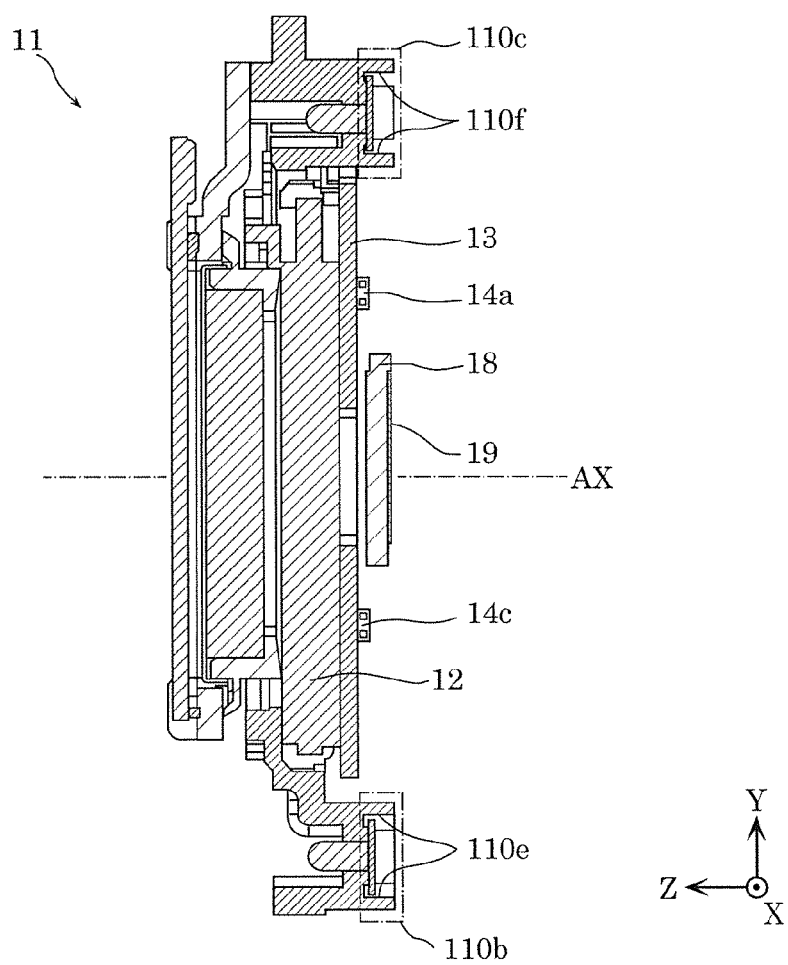
FIG. 6 is a sectional view of the movable frame according to the embodiment taken along line VI-VI in FIG. 5.
Figure 7A:
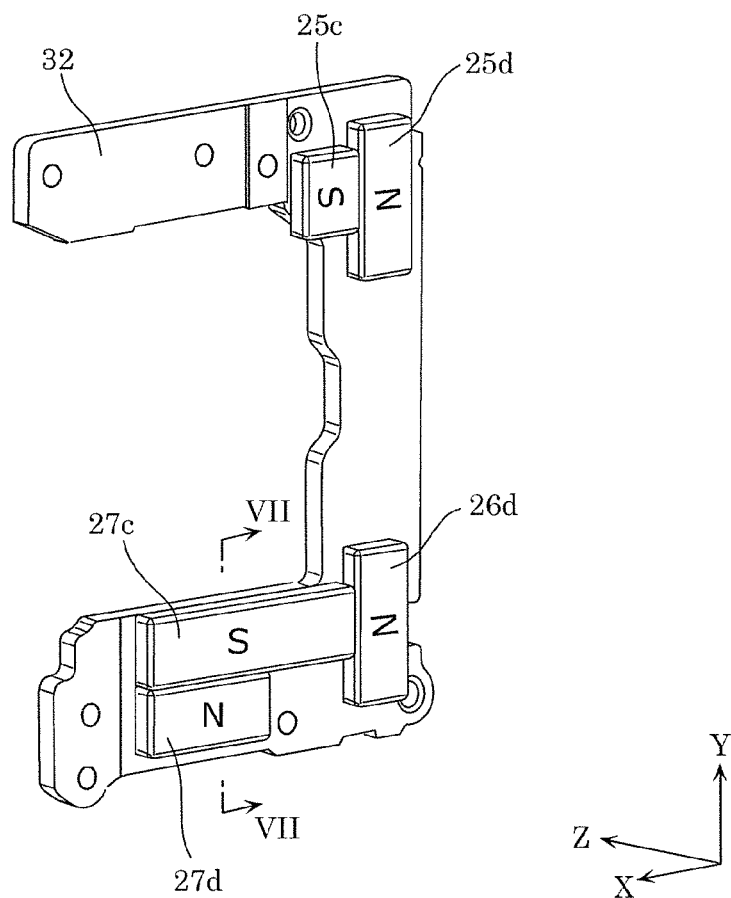
FIG. 7A is a back-side perspective view of a front fixed holding member according to the embodiment.
Figure 7B:
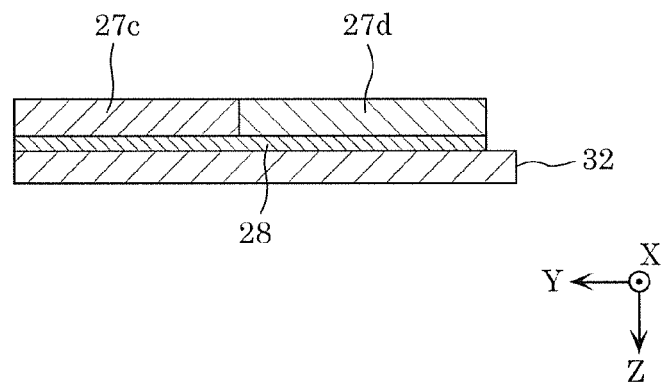
FIG. 7B is a sectional view of the front fixed holding member according to the embodiment taken along line VII-VII in FIG. 7A.

FIG. 3 is a front view of image blur correction device 1 according to the embodiment. FIG. 4 is an exploded perspective view of image blur correction device 1 according to the embodiment. FIG. 5 is a back view of movable frame 11 according to the embodiment. FIG. 6 is a sectional view of movable frame 11 according to the embodiment taken along line VI-VI in FIG. 5. FIG. 7A is a back-side perspective view of front fixed holding member 32 according to the embodiment. FIG. 7B is a sectional view of front fixed holding member 32 according to the embodiment taken along line VII-VII in FIG. 7A.

Image blur correction device 1 is a drive mechanism for driving imaging element 12. As illustrated in FIGS. 3 to 7A, image blur correction device 1 includes movable frame 11, circuit board 13, ball holders 110a, 110b, and 110c, drive coils 15, 16, and 17, drive magnets 25a, 25b, 25c, 25d, 26b, 26d, 27a, 27b, 27c, and 27d (an example of the magnet), magnetic displacement detection sensors 14a, 14b, and 14c (an example of the displacement detector), sensor magnets 22a, 22b, 23a, 23b, 24a, and 24b (an example of the magnet), attraction plate 19 (an example of the magnetic body), back fixed holding member 21 (an example of the fixed frame and the yoke), and front fixed holding member 32 (an example of the yoke).

Circuit board 13, ball holders 110a, 110b, and 110c, drive coils 15, 16, and 17, magnetic displacement detection sensors 14a, 14b, and 14c, and attraction plate 19 are attached to movable frame 11, as illustrated in FIG. 5. Drive magnets 25a, 25b, 26b, 27a, and 27b and sensor magnets 22a, 22b, 23a, 23b, 24a, and 24b are attached to back fixed holding member 21 with an adhesive, as illustrated in FIG. 4. Drive magnets 25c, 25d, 26d, 27c, and 27d are attached to front fixed holding member 32 with adhesive 28 (see FIG. 7B), as illustrated in FIG. 7A.

As illustrated in FIG. 7B, the whole back surfaces of drive magnets 27c and 27d are in contact with a fixed surface (surface on the side facing movable frame 11) of front fixed holding member 32 through adhesive 28. Likewise, the whole back surfaces of other drive magnets 25c, 25d, and 26d are in contact with the fixed surface of front fixed holding member 32 through adhesive 28, although not illustrated. Further, the whole back surfaces of drive magnets 25a, 25b, 26b, 27a, and 27b and sensor magnets 22a, 22b, 23a, 23b, 24a, and 24b are in contact with a fixed surface (surface on the side facing movable frame 11) of back fixed holding member 21 through an adhesive, although not illustrated.

As illustrated in FIGS. 3 to 6, movable frame 11 holds imaging element 12, and faces each of back fixed holding member 21 and front fixed holding member 32. Imaging element 12 is fixed to movable frame 11 with an adhesive or the like. Movable frame 11 holds imaging element 12 so as to be displaceable in a plane orthogonal to optical axis AX. Circuit board 13 is electrically connected to imaging element 12, and converts an electric signal from imaging element 12 from an analog signal to a digital signal. Ball holders 110a, 110b, and 110c hold ball members 31a, 31b, and 31c (an example of the support member) (see FIG. 4) that connect movable frame 11 to back fixed holding member 21. Ball members 31a, 31b, and 31c support movable frame 11 so as to be displaceable with respect to back fixed holding member 21. Ball holders 110a, 110b, and 110c will be described in detail later. The movement of movable frame 11 with respect to back fixed holding member 21 is regulated by a movement restriction mechanism (described later).

As illustrated in FIG. 5, three drive coils 15, 16, and 17 are fixed to movable frame 11 with an adhesive. The terminals of drive coils 15, 16, and 17 are electrically connected to circuit board 13 through FPC (Flexible Printed Circuits), and are fed with power from circuit board 13. Drive coil 15 faces the pair of drive magnets 25a and 25c and the pair of drive magnets 25b and 25d in the direction of optical axis AX. Drive coil 16 faces the pair of drive magnets 26b and 26d and the pair of drive magnets 27a and 27c in the direction of optical axis AX. Drive coil 17 faces the pair of drive magnets 27a and 27c and the pair of drive magnets 27b and 27d in the direction of optical axis AX. These drive coils 15 to 17 and drive magnets 25a to 27d constitute an actuator that drives imaging element 12.

In this embodiment, drive magnets 25a, 25d, 26d, 27a, and 27d are magnetized to the N pole on the side facing drive coils 15, 16, and 17. Drive magnets 25b, 25c, 26b, 27b, and 27c are magnetized to the S pole on the side facing drive coils 15, 16, and 17. Although the pair of drive magnets 27a and 27c face both drive coil 16 and drive coil 17 (to serve both purposes), four magnets may be used instead of the pair of drive magnets 27a and 27c. In detail, four magnets may be arranged so that two magnets out of the four magnets face drive coil 16 and the other two magnets face drive coil 17.

As illustrated in FIG. 5, three magnetic displacement detection sensors 14a, 14b, and 14c are disposed on circuit board 13. Magnetic displacement detection sensors 14a, 14b, and 14c are composed of Hall elements, for example. As illustrated in below-mentioned FIG. 9, sensor magnets 22a and 22b facing magnetic displacement detection sensor 14a in the direction of optical axis AX, sensor magnets 23a and 23b facing magnetic displacement detection sensor 14b in the direction of optical axis AX, and sensor magnets 24a and 24b facing magnetic displacement detection sensor 14c in the direction of optical axis AX are provided on back fixed holding member 21 facing magnetic displacement detection sensors 14a, 14b, and 14c. Magnetic displacement detection sensors 14a, 14b, and 14c and sensor magnets 22a, 22b, 23a, 23b, 24a, and 24b constitute a displacement detection mechanism that detects a displacement of imaging element 12 (movable frame 11) with respect to back fixed holding member 21. The displacement detection mechanism will be described later.

As illustrated in FIG. 4 and below-mentioned FIG. 9, sensor magnets 22a, 23a, and 24a are magnetized to the S pole on the side facing movable frame 11 (below-mentioned attraction plate 19), and magnetized to the N pole on the side opposite to attraction plate 19. Sensor magnets 22b, 23b, and 24b are magnetized to the N pole on the side facing movable frame 11 (attraction plate 19), and magnetized to the S pole on the side opposite to attraction plate 19.

Sensor magnets 22a, 22b, 23a, and 23b are an example of the first magnet, the second magnet, the third magnet, and the fourth magnet, respectively. The S pole side of sensor magnet 22a is an example of the S1 magnetized portion, and the N pole side of sensor magnet 22a is an example of the N1 magnetized portion. The N pole side of sensor magnet 22b is an example of the N2 magnetized portion, and the S pole side of sensor magnet 22b is an example of the S2 magnetized portion. The S pole side of sensor magnet 23a is an example of the S3 magnetized portion, and the N pole side of sensor magnet 23a is an example of the N3 magnetized portion. The N pole side of sensor magnet 23b is an example of the N4 magnetized portion, and the S pole side of sensor magnet 23b is an example of the S4 magnetized portion.

If magnetization complexity is allowed, the S1 to S4 magnetized portions and the N1 to N4 magnetized portions may be formed in one magnet. Alternatively, the S1 and S2 magnetized portions and the N1 and N2 magnetized portions may be formed in one magnet while the S3 and S4 magnetized portions and the N3 and N4 magnetized portions are formed on another magnet.

Attraction plate 19 is formed from a magnetic body such as a metal plate. As illustrated in FIGS. 4 to 6, attraction plate 19 is placed on movable frame 11 so as to face sensor magnets 22a, 22b, 23a, and 23b. Attraction plate 19 attracts movable frame 11 toward back fixed holding member 21 using the magnetic force of sensor magnets 22a, 22b, 23a, and 23b. This enables ball members 31a, 31b, and 31c respectively held by below-mentioned ball holders 110a, 110b, and 110c to be biased toward back fixed holding member 21 and pressed against movable frame 11. Attraction plate 19 and sensor magnets 22a, 22b, 23a, and 23b constitute a magnetic attraction mechanism. The magnetic attraction mechanism will be described later.

Back fixed holding member 21 is fixed to a support frame (not illustrated) in camera body 101.

[1-3. Ball Holder]

Ball holders 110a, 110b, and 110c will be described below, with reference to FIGS. 5 and 6.

As illustrated in FIG. 5, ball holders 110a, 110b, and 110c are approximately rectangular in a plan view, and are provided at three locations on movable frame 11. As illustrated in FIGS. 5 and 6, ball holders 110a, 110b, and 110c respectively have standing walls 110d, 110e, and 110f surrounding ball members 31a, 31b, and 31c. Standing walls 110d, 110e, and 110f are each a surface substantially parallel to optical axis AX from among the surfaces of a corresponding one of ball holders 110a, 110b, and 110c.

Ball holders 110a, 110b, and 110c each have a surface (hereafter referred to as "ball abutting surface") on which a corresponding one of ball members 31a, 31b, and 31c abuts and that is orthogonal to optical axis AX. As illustrated in below-mentioned FIG. 9, the ball abutting surfaces of ball holders 110a, 110b, and 110c are respectively formed by metal plates 111a, 111b, and 111c having smooth surfaces. In detail, back fixed holding member 21 has smooth surfaces approximately orthogonal to optical axis AX at positions facing ball members 31a, 31b, and 31c. Metal plates 111a, 111b, and 111c are fixed to back fixed holding member 21 with an adhesive or the like.

[1-4. Actuator]

[1-4-1. Structure of Actuator]

The structure of the actuator will be described below, with reference to FIGS. 4, 5, and 7A.

The actuator is a drive source for displacing movable frame 11 (imaging element 12) with respect to back fixed holding member 21. As illustrated in FIGS. 4, 5, and 7A, the actuator includes drive coils 15, 16, and 17, six pairs of drive magnets in three sets (i.e. a set of the pair of drive magnets 25a and 25c and the pair of drive magnets 25b and 25d, a set of the pair of drive magnets 26b and 26d and the pair of drive magnets 27a and 27c, a set of the pair of drive magnets 27a and 27c and the pair of drive magnets 27b and 27d). The actuator can correct an image blur caused by the movement of camera body 101 by displacing movable frame 11 with respect to back fixed holding member 21.

As illustrated in FIG. 4, drive magnets 25a, 25b, 26b, 27a, and 27b are arranged on back fixed holding member 21 located on the back side (the side opposite to the subject) of imaging element 12 so as to face drive coils 15, 16, and 17. As illustrated in FIG. 7A, drive magnets 25c, 25d, 26d, 27c, and 27d are arranged on front fixed holding member 32 located on the front side (subject side) of imaging element 12 so as to face drive coils 15, 16, and 17.

Each of drive coils 15, 16, and 17 moves from the central position with respect to the corresponding set out of the three sets of six pairs of drive magnets, according to the power feeding direction from circuit board 13. Three drive coils 15, 16, and 17 are provided in order to rotate movable frame 11 (imaging element 12) around the Z axis in a plane orthogonal to optical axis AX. Specifically, power for driving drive coil 15 in the X-axis positive direction illustrated in FIG. 4 is fed to drive coil 15, and power for driving drive coil 16 in the X-axis negative direction is fed to drive coil 16. This causes rotation around the Z axis, but the rotation center is not set. Therefore, the rotation center can be determined according to the amount and direction of power fed to drive coil 17. If the rotational drive around the Z axis is unnecessary, it is possible to drive movable frame 11 in the X-axis direction by feeding power with the phase in the same direction to drive coils 15 and 16, and drive movable frame 11 in the Y-axis direction by feeding power to drive coil 17. It is, however, difficult to align the position of center of gravity of movable frame 11 with the center of gravity of driving force. Hence, the amount and direction of power fed to each of drive coils 15, 16, and 17 is controlled according to the output of the below-mentioned displacement detector, to enable movable frame 11 to be driven in the X-axis direction, the Y-axis direction, and the roll direction.

[1-4-2. Drive Magnet Bonding Method]

Typically, a magnet is bonded to a magnetic body called "yoke". When bonding a magnet to a yoke by a conventional method, it is difficult to accurately attach the magnet to the yoke because the magnet is attracted to the yoke.

This embodiment proposes a method of simultaneously positioning a magnet with respect to a yoke and bonding the magnet to the yoke, as described below.

Figure 8:
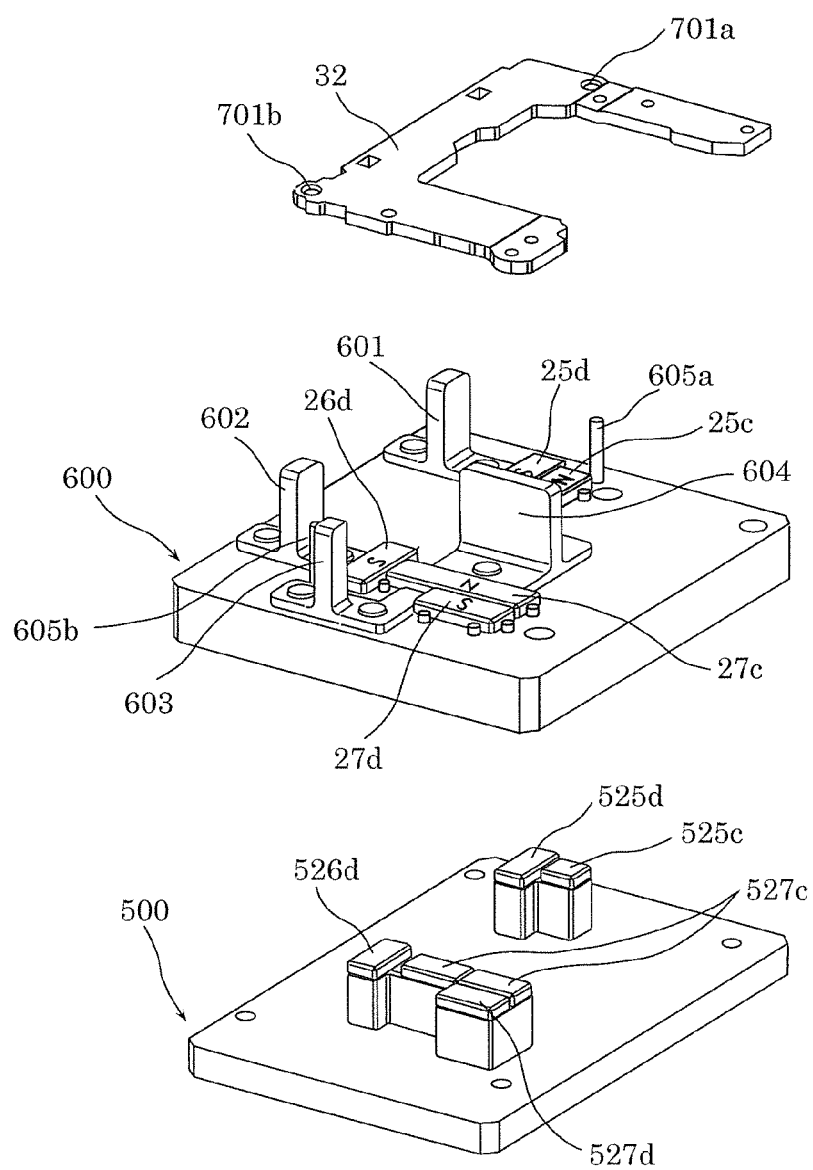
FIG. 8 is a perspective view illustrating a method of bonding drive magnets to the front fixed holding member according to the embodiment.

A method of bonding drive magnets 25c, 25d, 26d, 27c, and 27d to front fixed holding member 32 will be described below with reference to FIG. 8, as an example of a method of bonding a magnet to a yoke. FIG. 8 is a perspective view illustrating a method of bonding drive magnets 25c, 25d, 26d, 27c, and 27d to front fixed holding member 32 according to the embodiment.

In this embodiment, attraction jig 500 and base jig 600 are used when bonding drive magnets 25c, 25d, 26d, 27c, and 27d to front fixed holding member 32, as illustrated in FIG. 8.

Attraction jig 500 is a jig for magnetically attracting drive magnets 25c, 25d, 26d, 27c, and 27d toward base jig 600. Attraction magnets 525c, 525d, 526d, 527c, and 528c are attached to protrusions of attraction jig 500. Attraction magnets 525c, 525d, 526d, 527c, and 528c correspond in position to drive magnets 25c, 25d, 26d, 27c, and 27d, respectively. Attraction magnets 525c and 527c are magnetized to the N pole on the side facing base jig 600. Attraction magnets 525d, 526d, and 527d are magnetized to the S pole on the side facing base jig 600.

Base jig 600 is a jig for positioning drive magnets 25c, 25d, 26d, 27c, and 27d with respect to front fixed holding member 32. Positioning members 601, 602, 603, and 604 are attached to base jig 600. Positioning members 601, 602, 603, and 604 are used to position drive magnets 25c, 25d, 26d, 27c, and 27d. Base jig 600 has, at its attraction jig 500 side surface, grooves (not illustrated) into which attraction magnets 525c, 525d, 526d, 527c, and 528c attached to the protrusions of attraction jig 500 can be inserted. Base jig 600 also has position regulation pins 605a and 605b for positioning front fixed holding member 32 with respect to base jig 600. Front fixed holding member 32 has position regulation holes 701a and 701b through which position regulation pins 605a and 605b are respectively inserted.

The method of bonding drive magnets 25c, 25d, 26d, 27c, and 27d to front fixed holding member 32 will be described in detail below. As illustrated in FIG. 8, first, drive magnets 25c, 25d, 26d, 27c, and 27d are placed on base jig 600. Here, drive magnets 25c, 25d, 26d, 27c, and 27d are positioned with respect to base jig 600 by positioning members 601, 602, 603, and 604.

After this, attraction magnets 525c, 525d, 526d, 527c, and 528c of attraction jig 500 are inserted into the grooves of base jig 600, and drive magnets 25c, 25d, 26d, 27c, and 27d are magnetically attracted respectively by attraction magnets 525c, 525d, 526d, 527c, and 528c.

An adhesive is then applied to the back surface (i.e. the surface facing front fixed holding member 32) of each of drive magnets 25c, 25d, 26d, 27c, and 27d. Subsequently, front fixed holding member 32 is placed on base jig 600, to bond drive magnets 25c, 25d, 26d, 27c, and 27d to front fixed holding member 32 with the adhesive.

Thus, drive magnets 25c, 25d, 26d, 27c, and 27d can be fixed to front fixed holding member 32 without making holes in front fixed holding member 32 which is a yoke. Moreover, since an extra space for pouring the adhesive at the corners of drive magnets 25c, 25d, 26d, 27c, and 27d need not be secured on front fixed holding member 32, drive magnets 25c, 25d, 26d, 27c, and 27d can be located along the periphery of front fixed holding member 32, as illustrated in FIG. 7B. Hence, the actuator can be reduced in size while ensuring a large magnetic force by increasing drive magnets 25c, 25d, 26d, 27c, and 27d in size.

Although front fixed holding member 32 is placed on the surface of base jig 600 on the side opposite to attraction jig 500 in this embodiment, front fixed holding member 32 may be sandwiched between attraction jig 500 and base jig 600. Moreover, coils may be arranged on attraction jig 500 instead of attraction magnets 525c, 525d, 526d, 527c, and 528c, and current may be applied to the coils to magnetically attract drive magnets 25c, 25d, 26d, 27c, and 27d. Although the adhesive is applied to the back surface of each of drive magnets 25c, 25d, 26d, 27c, and 27d in this embodiment, the adhesive may be applied to front fixed holding member 32.

The bonding method described above can be used not only in the case of bonding drive magnets 25c, 25d, 26d, 27c, and 27d to front fixed holding member 32, but also in the case of bonding drive magnets 25a, 25b, 26b, 27a, and 27b to back fixed holding member 21 and in the case of bonding sensor magnets 22a, 22b, 23a, 23b, 24a, and 24b to sensor magnet yoke plate 29 (see below-mentioned FIG. 9).

[1-5. Displacement Detection Mechanism]

The displacement detection mechanism will be described below, with reference to FIGS. 5 and 9. FIG. 9 is a front view of back fixed holding member 21 according to the embodiment.

Figure 9:
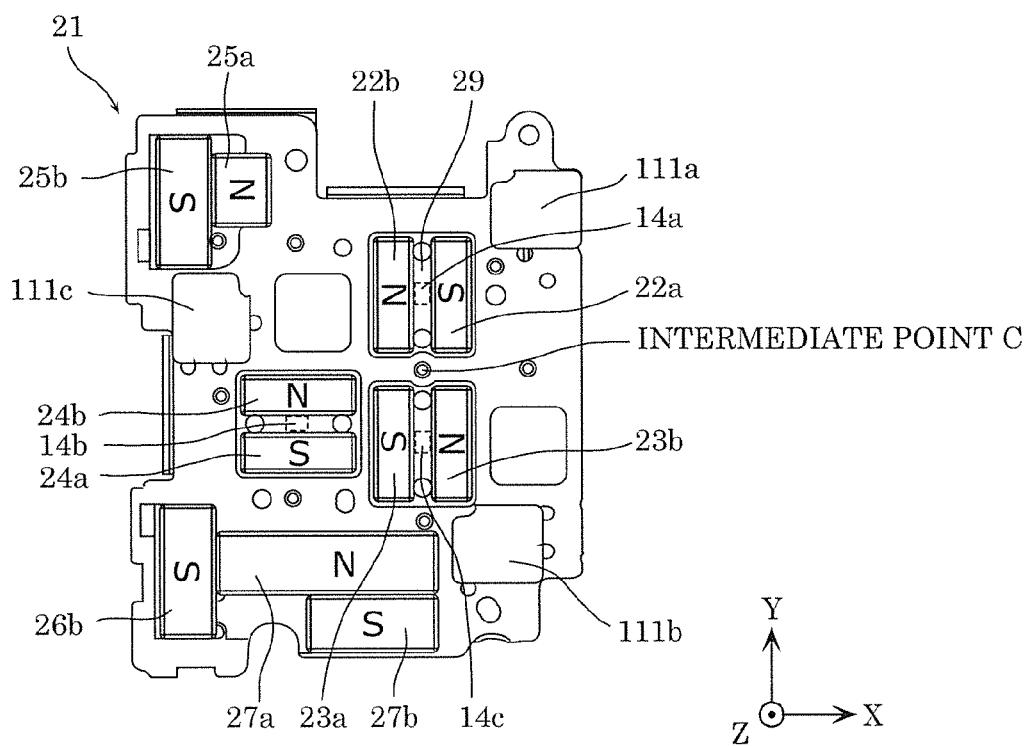
FIG. 9 is a front view of a back fixed holding member according to the embodiment.

The displacement detection mechanism includes magnetic displacement detection sensors 14a, 14b, and 14c and sensor magnets 22a, 22b, 23a, 23b, 24a, and 24b, as illustrated in FIGS. 5 and 9.

As illustrated in FIG. 5, magnetic displacement detection sensors 14a, 14b, and 14c are provided at three locations on circuit board 13 on the back side of imaging element 12. Each of magnetic displacement detection sensors 14a, 14b, and 14c detects the displacement of imaging element 12 in at least one of the X-axis direction and the Y-axis direction. Another magnetic displacement detection sensor is disposed in one of the X-axis direction and the Y-axis direction. In this embodiment, magnetic displacement detection sensors 14a and 14b are disposed at two locations for displacement detection in the X-axis direction, and magnetic displacement detection sensor 14c is disposed at one location for displacement detection in the Y-axis direction. In this case, intermediate point C on the line connecting two magnetic displacement detection sensors 14a and 14b that detect the displacement in the X-axis direction is defined as substantially the center position of imaging element 12 in the formation of the below-mentioned magnetic attraction mechanism.

As illustrated in FIG. 9, a pair of sensor magnets 22a and 22b, a pair of sensor magnets 23a and 23b, and a pair of sensor magnets 24a and 24b are disposed on back fixed holding member 21 at positions respectively corresponding to magnetic displacement detection sensors 14a, 14b, and 14c. Sensor magnets 22a, 22b, 23a, 23b, 24a, and 24b are fixed to sensor magnet yoke plate 29 fixed to back fixed holding member 21, with an adhesive or the like.

In this embodiment, sensor magnets 22a, 22b, 23a, 23b, 24a, and 24b are fixed to sensor magnet yoke plate 29 of back fixed holding member 21 with an adhesive, by the bonding method described above.

The displacement detection mechanism can accurately detect the displacement of imaging element 12 in at least the X direction, the Y direction, and the roll direction.

[1-6. Magnetic Attraction Mechanism]
[1-6-1. Structure of Magnetic Attraction Mechanism]

The structure of the magnetic attraction mechanism will be described below, with reference to FIGS. 4, 5, 6, and 9. The magnetic attraction mechanism includes attraction plate 19 and sensor magnets 22a, 22b, 23a, and 23b, as illustrated in FIGS. 5 and 9.

As illustrated in FIGS. 4 and 5, unless imaging element 12 is constantly pressed toward back fixed holding member 21, ball members 31a, 31b, and 31c in ball holders 110a, 110b, and 110c fall, making it impossible to achieve smooth drive by rolling. Accordingly, in this embodiment, the magnetic force of sensor magnets 22a, 22b, 23a, 23b, 24a, and 24b toward magnetic displacement detection sensors 14a, 14b, and 14c is used to apply an attraction force between attraction plate 19 and sensor magnets 22a, 22b, 23a, and 23b. This can solve the problem of the conventional configuration using a tension spring mentioned above, and save the space for disposing a tension spring. Image blur correction device 1 that is compact and has high control performance can thus be achieved.

In detail, as illustrated in FIGS. 5 and 6, attraction plate 19 is fixed to holding member 18 attached to movable frame 11, with an adhesive or the like. Holding member 18 is made of, for example, aluminum. Attraction plate 19 is disposed so that, in a state in which attraction plate 19 is held at the central position in the movable range of imaging element 12 (i.e. attraction plate 19 is not displaced with respect to back fixed holding member 21), the center of attraction plate 19 coincides with intermediate point C of the gap surrounded by sensor magnets 22a, 22b, 23a, and 23b in a plane orthogonal to optical axis AX. Attraction plate 19 is also disposed so that two sides 19L1 and 19L3 (see below-mentioned FIG. 10A) of attraction plate 19 facing each other are parallel to the X-axis direction, and remaining two sides 19L2 and 19L4 (see below-mentioned FIG. 10A) facing each other are parallel to the Y-axis direction.

As illustrated in FIG. 6, imaging element 12, circuit board 13, magnetic displacement detection sensors 14a, 14b, and 14c, holding member 18, and attraction plate 19 are arranged in this order along the direction of optical axis AX, and fixed to movable frame 11 by screw fastening or the like. With this structure, sensor magnets 22a, 22b, 23a, and 23b can be attracted by attraction plate 19 at a substantial center of imaging element 12, i.e. near optical axis AX. Therefore, stable attraction force can be maintained even when imaging element 12 is displaced.

[1-6-2. Function of Magnetic Attraction Mechanism]

As a result of movable frame 11 being displaced with respect to back fixed holding member 21, the magnetic attraction force of attraction plate 19 for sensor magnets 22a, 22b, 23a, and 23b changes. With the change of the magnetic attraction force, the rotation torque acting on movable frame 11 changes, too. The rotation torque causes a load on the actuator when correcting an image blur. It is therefore desirable to reduce the rotation torque.

The following Experiments 1 and 2 were conducted to examine the relationship between sensor magnets 22a, 22b, 23a, and 23b and each of the magnetic attraction force (hereafter referred to as "attraction force") and the rotation torque (hereafter referred to as "torque").

1-6-2-1. Experiment 1

Experiment 1 will be described below, with reference to FIGS. 10A to 13. In Experiment 1, the attraction force and the torque acting on attraction plate 19 when moving attraction plate 19 were compared between Example and Comparative Example 1.

Figure 10A:
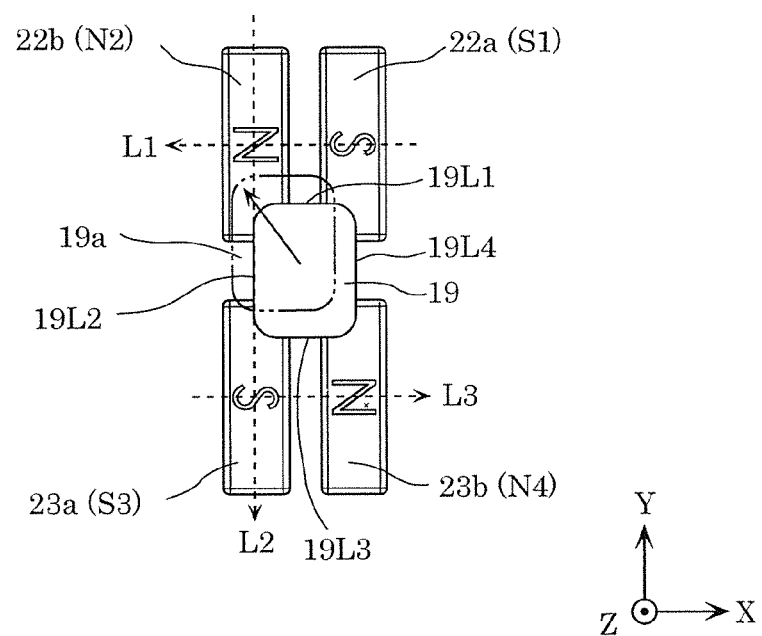
FIG. 10A is a view illustrating the magnetization of sensor magnets according to Example.
Figure 10B:
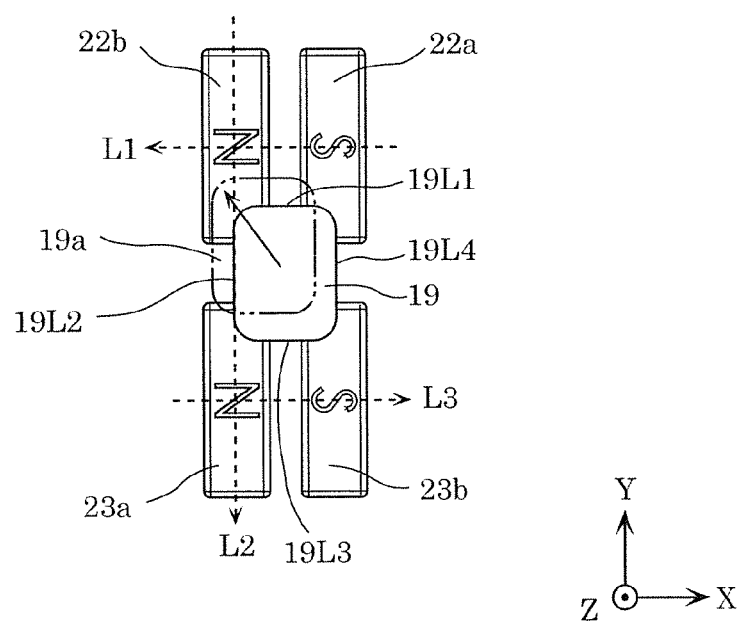
FIG. 10B is a view illustrating the magnetization of sensor magnets according to Comparative Examples 1 and 2.
Figure 11:
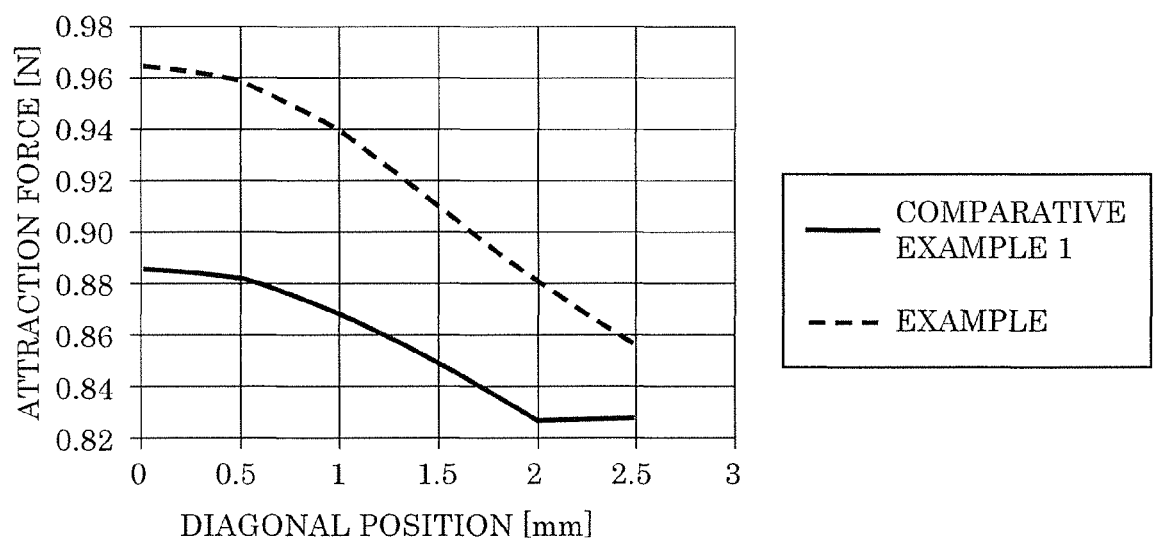
FIG. 11 is a graph illustrating the relationship between the diagonal position of an attraction plate and the attraction force in the optical axis direction acting on the attraction plate in Experiment 1.
Figure 12:
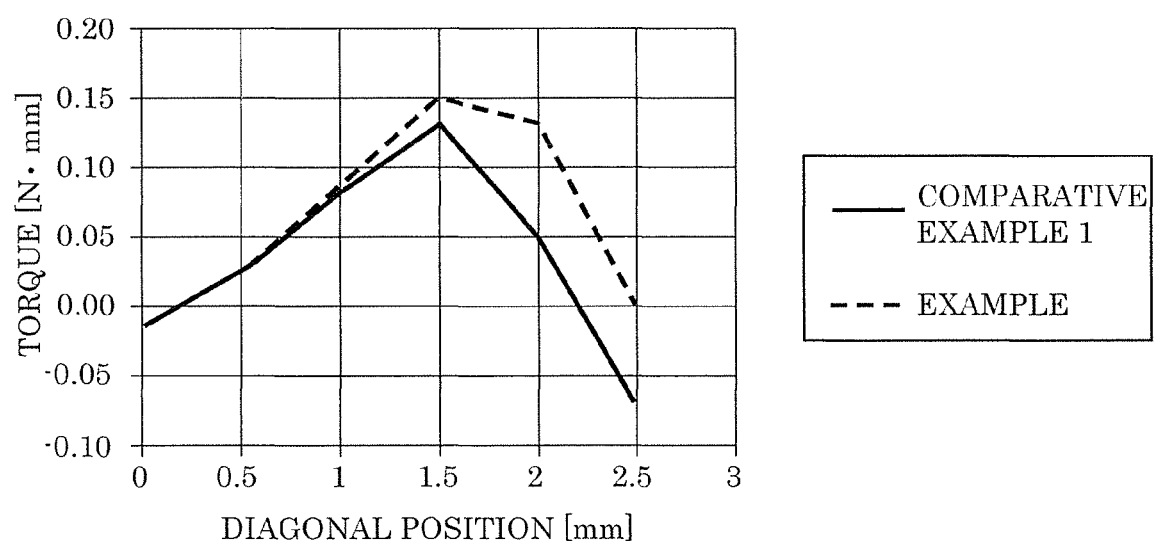
FIG. 12 is a graph illustrating the relationship between the diagonal position of the attraction plate and the torque acting on the attraction plate in Experiment 1.
Figure 13:
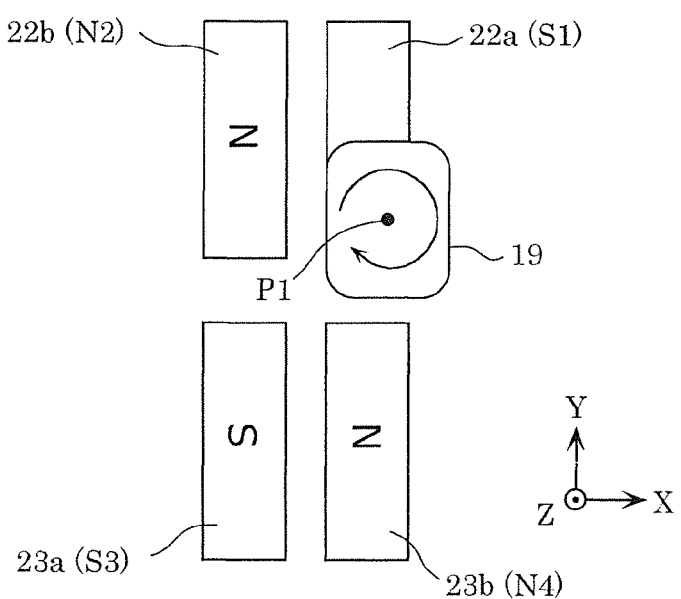
FIG. 13 is a view illustrating torque measurement conditions in Experiment 1.

FIG. 10A is a diagram illustrating the magnetization of sensor magnets 22a, 22b, 23a, and 23b according to Example. FIG. 10B is a diagram illustrating the magnetization of sensor magnets 22a, 22b, 23a, and 23b according to Comparative Examples 1 and 2. FIG. 11 is a graph illustrating the relationship between the diagonal position of attraction plate 19 and the attraction force in the direction of optical axis AX acting on attraction plate 19 in Experiment 1. FIG. 12 is a graph illustrating the relationship between the diagonal position of attraction plate 19 and the torque acting on attraction plate 19 in Experiment 1. FIG. 13 is a diagram illustrating the torque measurement conditions in Experiment 1.

As illustrated in FIG. 10A, in Example, sensor magnets 22a and 23a were magnetized to the same pole (S pole) on the side facing attraction plate 19, and sensor magnets 22b and 23b were magnetized to the same pole (N pole) on the side facing attraction plate 19, as in the embodiment.

In more detail, sensor magnets 22a, 22b, 23a, and 23c respectively had, on the side facing attraction plate 19 (on the Z-axis positive direction side), an S1 magnetized portion of sensor magnet 22a as the S pole, an N2 magnetized portion of sensor magnet 22b as the N pole located at a position adjacent to the S1 magnetized portion in an L1 direction (X-axis negative direction; an example of the first direction), an S3 magnetized portion of sensor magnet 23a as the S pole located at a position adjacent to the N2 magnetized portion in an L2 direction (Y-axis negative direction; an example of the second direction) intersecting the L1 direction, and an N4 magnetized portion of sensor magnet 23b as the N pole located at a position adjacent to the S3 magnetized portion in an L3 direction (X-axis positive direction; an example of the third direction) intersecting the L2 direction and adjacent to the S1 magnetized portion. Moreover, attraction plate 19 overlapped at least part of the S1 magnetized portion, the N2 magnetized portion, the S3 magnetized portion, and the N4 magnetized portion, when viewed in the direction of optical axis AX (Z-axis direction).

Further, the portions opposite to the S1 magnetized portion, the N2 magnetized portion, the S3 magnetized portion, and the N4 magnetized portion in the direction of optical axis AX (on the Z-axis negative direction side) were respectively an N1 magnetized portion as the N pole, an S2 magnetized portion as the S pole, an N3 magnetized portion as the N pole, and an S4 magnetized portion as the S pole. The gap between attraction plate 19 and sensor magnets 22a, 22b, 23a, and 23b was 0.73 mm. The size of attraction plate 19 was 6.5 mm×8.2 mm.

In Example, the L1 direction and the L2 direction were perpendicular to each other, and the L1 direction and the L3 direction were parallel to each other. If position detection complexity is allowed, the L1 direction and the L2 direction need not necessarily be perpendicular to each other, and the L1 direction and the L3 direction need not necessarily be parallel to each other.

As illustrated in FIG. 10B, in Comparative Example 1, sensor magnets 22a and 23b were magnetized to the same pole (S pole) on the side facing attraction plate 19, and sensor magnets 22b and 23a were magnetized to the same pole (N pole) on the side facing attraction plate 19. The gap between attraction plate 19 and sensor magnets 22a, 22b, 23a, and 23b was 0.73 mm. The size of attraction plate 19 was 6.5 mm×8.2 mm.

FIG. 11 illustrates the relationship between the diagonal position of attraction plate 19 and the attraction force acting on attraction plate 19 in Experiment 1. The diagonal position of attraction plate 19 herein denotes the position of attraction plate 19 in the solid arrow direction in FIGS. 10A and 10B relative to, as a reference position (diagonal position: 0 mm), the intermediate point C of sensor magnets 22a, 22b, 23a, and 23b (see FIG. 9). An approximately rectangular outline 19a designated by dashed-dotted lines in FIGS. 10A and 10B represents attraction plate 19 after movement. As illustrated in FIG. 11, the attraction force acting on attraction plate 19 was greater in Example than in Comparative Example 1. This indicates that movable frame 11 was able to be more stably held with respect to back fixed holding member 21 in Example than in Comparative Example 1.

FIG. 12 illustrates the relationship between the diagonal position of attraction plate 19 and the torque acting on attraction plate 19 in Experiment 1. In Experiment 1, the rotation moment with center P1 of attraction plate 19 as the rotation axis was measured as the torque, as designated by the solid arrow in FIG. 13. As illustrated in FIG. 12, the torque was substantially not different between Example and Comparative Example 1 up to a diagonal position of attraction plate 19 (displacement amount) of about 1 mm. This indicates that, while the torque increased in Comparative Example 1 in the case of attempting to obtain the same level of attraction force as Example, in Example the torque was able to be reduced to such a level comparable to Comparative Example.

These results demonstrate that, in Example, torque reduction and attraction force improvement were both achieved to thus reduce the load on the actuator and allow the actuator to be reduced in size.

1-6-2-2. Experiment 2

Experiment 2 will be described below, with reference to FIGS. 14 to 16. In Experiment 2, the attraction force and the torque acting on attraction plate 19 when moving attraction plate 19 were compared between Example and Comparative Examples 1 and 2.

Figure 14:
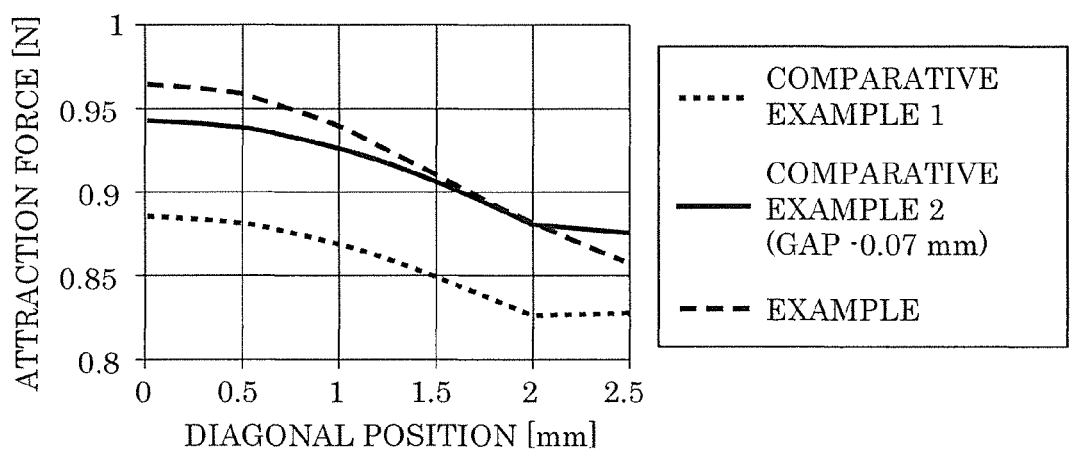
FIG. 14 is a graph illustrating the relationship between the diagonal position of the attraction plate and the attraction force in the optical axis direction acting on the attraction plate in Experiment 2.

FIG. 14 is a graph illustrating the relationship between the diagonal position of attraction plate 19 and the attraction force in the direction of optical axis AX acting on attraction plate 19 in Experiment 2. FIG. 15 is a graph illustrating the relationship between the diagonal position of attraction plate 19 and the torque acting on attraction plate 19 in Experiment 2. FIG. 16 is a diagram illustrating the torque measurement conditions in Experiment 2.

The experimental conditions of each of Example and Comparative Example 1 in Experiment 2 were the same as those in Experiment 1. In Comparative Example 2, the gap between attraction plate 19 and sensor magnets 22a, 22b, 23a, and 23b was narrowed by 0.07 mm from Comparative Example 1. The other experimental conditions of Comparative Example 2 were the same as those of Comparative Example 1.

FIG. 14 illustrates the relationship between the diagonal position of attraction plate 19 and the attraction force acting on attraction plate 19 in Experiment 2. As illustrated in FIG. 14, the attraction force acting on attraction plate 19 was greater in Example than in Comparative Examples 1 and 2, as in Experiment 1. In addition, the attraction force acting on attraction plate 19 was greater in Comparative Example 2 than in Comparative Example 1, because of a reduction of 0.07 mm in the gap between attraction plate 19 and sensor magnets 22a, 22b, 23a, and 23b.

Figure 15:
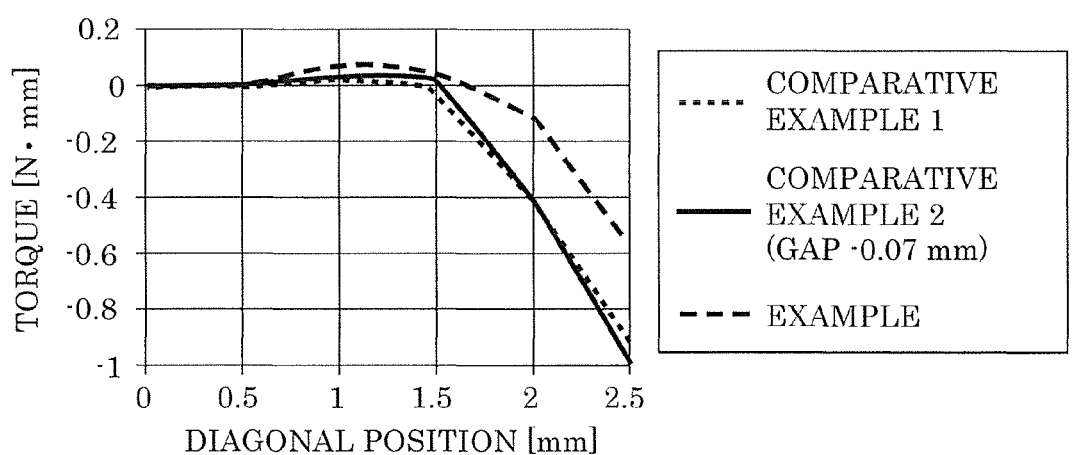
FIG. 15 is a graph illustrating the relationship between the diagonal position of the attraction plate and the torque acting on the attraction plate in Experiment 2.
Figure 16:
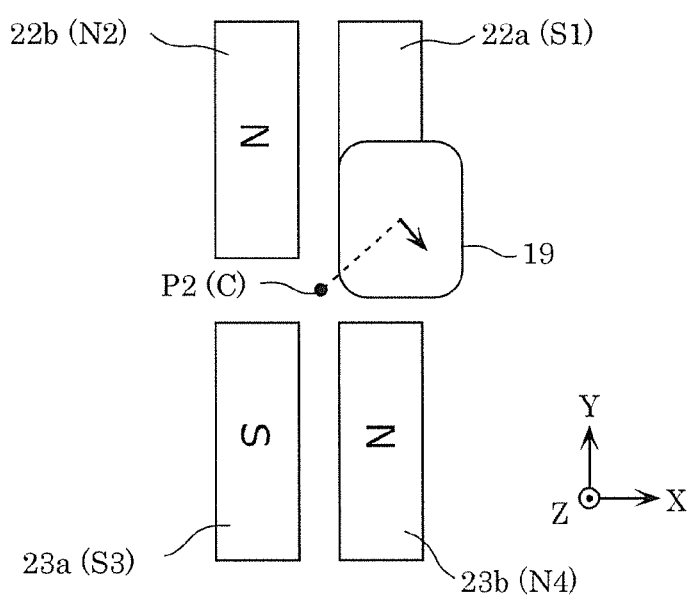
FIG. 16 is a view illustrating torque measurement conditions in Experiment 2.

FIG. 15 illustrates the relationship between the diagonal position of attraction plate 19 and the torque acting on attraction plate 19 in Experiment 2. In Experiment 2, the rotation moment with initial position P2 (intermediate point C) of attraction plate 19 as the rotation axis was measured as the torque, as designated by the solid arrow in FIG. 16. As illustrated in FIG. 15, the torque was closer to zero in Example than Comparative Examples 1 and 2 at a diagonal position of attraction plate 19 (displacement amount) of 1.5 mm or more, as in Experiment 1.

These results demonstrate that, in Example, torque reduction and attraction force improvement were both achieved to thus reduce the load on the actuator and allow the actuator to be reduced in size.

In Comparative Example 2, when the gap between attraction plate 19 and sensor magnets 22a, 22b, 23a, and 23b is narrowed excessively in order to increase the attraction force acting on attraction plate 19, the load on the actuator in the X direction and the Y direction tends to increase. In Example, on the other hand, the attraction force acting on attraction plate 19 can be increased without excessively narrowing the gap between attraction plate 19 and sensor magnets 22a, 22b, 23a, and 23b, so that the load on the actuator in the X direction and the Y direction can be reduced.

[1-7. Movement Restriction Mechanism]

The structure of the movement restriction mechanism will be described below, with reference to FIG. 4. The movement restriction mechanism includes position regulation members 34a, 34b, and 34c attached to attachment member 33, and position regulation members 36a, 36b, and 36c attached respectively to columns 35a, 35b, and 35c, as illustrated in FIG. 4.

As mentioned above, when ball members 31a, 31b, and 31c abut on respective standing walls 110d, 110e, and 110f of rectangular ball holders 110a, 110b, and 110c as a result of displacement of imaging element 12, friction load greater than or equal to rolling load occurs. This friction load becomes a variation element for the drive force of the actuator, and thus makes it difficult to perform accurate image blur correction control. Besides, under an unexpected impact or the like, ball members 31a, 31b, and 31c may climb over standing walls 110d, 110e, and 110f and fall off.

In view of this, in this embodiment, position regulation members 34a, 34b, and 34c are attached to attachment member 33 and position regulation members 36a, 36b, and 36c are attached respectively to columns 35a, 35b, and 35c so as to suppress abnormal noise when movable frame 11 moves with respect to back fixed holding member 21 and abuts on attachment member 33 and columns 35a, 35b, and 35c, as illustrated in FIG. 4. Movable frame 11 abuts on attachment member 33 through position regulation members 34a, 34b, and 34c, and abuts on columns 35a, 35b, and 35c through position regulation members 36a, 36b, and 36c.

Moreover, by bringing the center of gravity of movable frame 11 in the direction of optical axis AX into contact with position regulation members 34a, 34b, 34c, 36a, 36b, and 36c, the rotation moment and the rotation in the yaw direction and the pitch direction can be suppressed to prevent movable frame 11 from coming into contact with back fixed holding member 21 and front fixed holding member 32. Position regulation members 34a, 34b, 34c, 36a, 36b, and 36c have cushioning property, and thus also have a shock-absorbing function.

2. Operation

The operation of image blur correction device 1 according to this embodiment will be described below. In the case where the optical axis of light from the subject is displaced from the center of imaging element 12 due to the movement of camera body 101 during image capture by digital camera 100, magnetic displacement detection sensors 14a, 14b, and 14c detect the displacement direction and the displacement amount of imaging element 12 in the right-left direction, the up-down direction, the yaw direction, the pitch direction, and the roll direction. Circuit board 13 measures the detected displacement direction and displacement amount, and the controller in circuit board 13 feeds power to drive coils 15, 16, and 17 according to the measurement result.

Here, circuit board 13 feeds power to at least one of drive coils 15, 16, and 17 according to the measured displacement amount and displacement direction. As a result of the power feeding, the magnetic force for corresponding drive magnets 25a, 25b, 25c, 25d, 27a, 27c, 26b, 26d, 27a, 27b, 27c, and 27d changes, and movable frame 11 is displaced with respect to back fixed holding member 21. Thus, imaging element 12 fixed to movable frame 11 is displaced in such a displacement direction and displacement amount that corrects an image blur.

3. Advantageous Effects

Image blur correction device 1 according to the embodiment is an imaging element driving device that drives imaging element 12. Image blur correction device 1 includes: back fixed holding member 21; movable frame 11 that is used to hold imaging element 12, faces back fixed holding member 21 in a direction of optical axis AX, and is displaceable in a plane orthogonal to the direction of optical axis AX with respect to back fixed holding member 21; attraction plate 19 that is provided on one of back fixed holding member 21 and movable frame 11; and at least one sensor magnet 22a, 22b, 23a, 23b that is provided on an other one of back fixed holding member 21 and movable frame 11 and faces attraction plate 19 in the direction of optical axis AX. At least one sensor magnet 22a, 22b, 23a, 23b has, on a side facing attraction plate 19: an S1 magnetized portion magnetized to an S pole; an N2 magnetized portion located at a position adjacent to the S1 magnetized portion in an L1 direction, and magnetized to an N pole; an S3 magnetized portion located at a position adjacent to the N2 magnetized portion in an L2 direction intersecting the L1 direction, and magnetized to the S pole; and an N4 magnetized portion located at a position adjacent to the S3 magnetized portion in an L3 direction intersecting the L2 direction and adjacent to the S1 magnetized portion, and magnetized to the N pole. Attraction plate 19 overlaps at least part of the S1 magnetized portion, the N2 magnetized portion, the S3 magnetized portion, and the N4 magnetized portion, when viewed in the direction of optical axis AX.

With this, while suppressing the rotation torque acting on attraction plate 19, the attraction force between attraction plate 19 and sensor magnets 22a, 22b, 23a, and 23b can be enhanced. Consequently, the load on the actuator can be reduced, and stable attraction force by attraction plate 19 can be maintained even when imaging element 12 is displaced. Thus, imaging element 12 can be driven stably.

Moreover, in this embodiment, at least one sensor magnet 22a, 22b, 23a, 23b further has: an N1 magnetized portion located on a side opposite to the S1 magnetized portion in the direction of optical axis AX, and magnetized to the N pole; an S2 magnetized portion located on a side opposite to the N2 magnetized portion in the direction of optical axis AX, and magnetized to the S pole; an N3 magnetized portion located on a side opposite to the S3 magnetized portion in the direction of optical axis AX, and magnetized to the N pole; and an S4 magnetized portion located on a side opposite to the N4 magnetized portion in the direction of optical axis AX, and magnetized to the S pole.

With this, the magnetic force in the direction of optical axis AX can be increased, and imaging element 12 can be driven more stably even when imaging element 12 is displaced.

Moreover, in this embodiment, the at least one magnet includes a plurality of magnets, and the plurality of magnets include: sensor magnet 22a having the S1 magnetized portion; sensor magnet 22b having the N2 magnetized portion; sensor magnet 23a having the S3 magnetized portion; and sensor magnet 23b having the N4 magnetized portion.

With this, each of sensor magnets 22a, 22b, 23a, and 23b can be formed by a magnet of unidirectional magnetization (NS magnetization). This enables each of sensor magnets 22a, 22b, 23a, and 23b to be provided at low cost. In addition, since the intervals between sensor magnets 22a, 22b, 23a, and 23b can be adjusted, the detection sensitivity of magnetic displacement detection sensors 14a, 14b, and 14c can be adjusted more easily than in the case of including only one magnet.

Moreover, in this embodiment, image blur correction device 1 further includes: magnetic displacement detection sensor 14a, 14b, 14c that detects a displacement of movable frame 11 with respect to back fixed holding member 21 based on a change in magnetic flux of at least one sensor magnet 22a, 22b, 23a, 23b, is provided on the other one of back fixed holding member 21 and movable frame 11, and faces at least one sensor magnet 22a, 22b, 23a, 23b in the direction of optical axis AX.

With this, imaging element 12 can be driven stably even when imaging element 12 is displaced. Hence, the displacement position of imaging element 12 can be detected accurately.

Moreover, in this embodiment, image blur correction device 1 further includes: an actuator that displaces movable frame 11 with respect to back fixed holding member 21. Magnetic displacement detection sensor 14a, 14b, 14c detects a displacement amount and a displacement direction of movable frame 11 with respect to back fixed holding member 21. The actuator displaces movable frame 11 with respect to back fixed holding member 21, based on the displacement amount and the displacement direction of movable frame 11 detected.

With this, an image blur caused by the movement of camera body 101 can be corrected.

Moreover, in this embodiment, movable frame 11, magnetic displacement detection sensor 14a, 14b, 14c, attraction plate 19, and sensor magnets 22a, 22b, 23a, and 23b are arranged in the stated order along the direction of optical axis AX.

With this, stable attraction force by attraction plate 19 can be maintained even when imaging element 12 is displaced.

Moreover, in this embodiment, image blur correction device 1 further includes: ball member 31a, 31b, 31c that supports movable frame 11 to be displaceable with respect to back fixed holding member 21. Ball member 31a, 31b, 31c is pressed against movable frame 11 or back fixed holding member 21, as a result of attraction plate 19 being attracted to at least one sensor magnet 22a, 22b, 23a, 23b.

With this, ball member 31a, 31b, 31c can be biased toward one of back fixed holding member 21 and movable frame 11.

Moreover, in this embodiment, in a state in which movable frame 11 is not displaced with respect to back fixed holding member 21, attraction plate 19 is located with a center thereof being aligned with intermediate point C of the S1 magnetized portion, the N2 magnetized portion, the S3 magnetized portion, and the N4 magnetized portion along the direction of optical axis AX.

With this, imaging element 12 can be stably attracted in the direction of optical axis AX, which eases actuator control when displacing imaging element 12. As a result, imaging element 12 can be displaced to a target position with higher accuracy.

Moreover, in this embodiment, a section of attraction plate 19 perpendicular to the direction of optical axis AX has a circular shape or an approximately polygonal shape.

With this, imaging element 12 can be more stably attracted in the direction of optical axis AX, which further eases actuator control when moving imaging element 12. As a result, the imaging element can be displaced to a target position with higher accuracy.

Moreover, in this embodiment, image blur correction device 1 further includes: a movement restriction mechanism that regulates movement of movable frame 11 with respect to back fixed holding member 21.

With this, imaging element 12 can be displaced to a target position accurately.

Moreover, in this embodiment, the movement restriction mechanism includes position regulation member 34a, 34b, 34c, 36a, 36b, 36c. Position regulation member 34a, 34b, 34c, 36a, 36b, 36c is located to come into contact with a center of gravity of movable frame 11 in the direction of optical axis AX when movable frame 11 comes into contact with position regulation member 34a, 34b, 34c, 36a, 36b, 36c.

With this, ball member 31a, 31b, 31c can be prevented from climbing over standing wall 110d, 110e, 110f and falling off, under an unexpected impact or the like.

Digital camera 100 according to this embodiment includes: image blur correction device 1 described above; and imaging element 12 that converts an optical image of a subject into an electric signal. Movable frame 11 holds imaging element 12 to be displaceable with respect to back fixed holding member 21.

With this, digital camera 100 with higher image blur correction capability can be provided.

Digital camera 100 according to this embodiment includes: image blur correction device 1 described above; and a plurality of optical systems that condense light from a subject. Movable frame 11 holds at least one of the plurality of optical systems to be displaceable with respect to back fixed holding member 21.

With this, digital camera 100 with higher image blur correction capability can be provided.

A method for manufacturing image blur correction device 1 according to this embodiment is a method for manufacturing image blur correction device 1 that includes front fixed holding member 32 and drive magnet 25c, 25d, 26d, 27c, 27d fixed to front fixed holding member 32. The method for manufacturing image blur correction device 1 includes: placing drive magnet 25c, 25d, 26d, 27c, 27d on base jig 600; attracting drive magnet 25c, 25d, 26d, 27c, 27d toward base jig 600 by attraction jig 500; applying an adhesive to one of drive magnet 25c, 25d, 26d, 27c, 27d and front fixed holding member 32; and mounting front fixed holding member 32 on base jig 600 to fix drive magnet 25c, 25d, 26d, 27c, 27d to front fixed holding member 32 with the adhesive.

With this, drive magnet 25c, 25d, 26d, 27c, 27d can be fixed to front fixed holding member 32 without making holes in front fixed holding member 32 which is a yoke. Moreover, since an extra space for pouring the adhesive at the corners of drive magnet 25c, 25d, 26d, 27c, 27d need not be secured on front fixed holding member 32, drive magnet 25c, 25d, 26d, 27c, 27d can be located along the periphery of front fixed holding member 32. Hence, the actuator can be reduced in size while ensuring a large magnetic force by increasing drive magnet 25c, 25d, 26d, 27c, 27d in size.

Moreover, in this embodiment, attraction jig 500 has attraction magnet 525c, 525d, 526d, 527c, 527d located at a position corresponding to drive magnet 25c, 25d, 26d, 27c, 27d placed on base jig 600. In the attracting, drive magnet 25c, 25d, 26d, 27c, 27d is attracted toward base jig 600 by a magnetic force of attraction magnet 525c, 525d, 526d, 527c, 527d of attraction jig 500.

With this, drive magnet 25c, 25d, 26d, 27c, 27d can be held on base jig 600 when mounting front fixed holding member 32 on base jig 600.

Moreover, in this embodiment, base jig 600 has positioning member 601, 602, 603, 604 that positions drive magnet 25c, 25d, 26d, 27c, 27d. In the placing, drive magnet 25c, 25d, 26d, 27c, 27d is placed on base jig 600 to position drive magnet 25c, 25d, 26d, 27c, 27d with respect to base jig 600 by positioning member 601, 602, 603, 604.

With this, drive magnet 25c, 25d, 26d, 27c, 27d can be easily positioned with respect to base jig 600.

Moreover, in this embodiment, base jig 600 has position regulation pin 605a, 605b. Front fixed holding member 32 has position regulation hole 701a, 701b through which position regulation pin 605a, 605b is inserted. In the mounting, front fixed holding member 32 is mounted on base jig 600 with position regulation pin 605a, 605b being inserted through position regulation hole 701a, 701b.

With this, front fixed holding member 32 can be easily positioned with respect to base jig 600.

Image blur correction device 1 according to this embodiment is an imaging element driving device that drives imaging element 12. Image blur correction device 1 includes: front fixed holding member 32 having a fixed surface; and drive magnet 25c, 25d, 26d, 27c, 27d that is used to drive imaging element 12, and fixed to the fixed surface of front fixed holding member 32 with an adhesive. A whole back surface of drive magnet 25c, 25d, 26d, 27c, 27d is in contact with the fixed surface of front fixed holding member 32 through the adhesive.

With this, drive magnet 25c, 25d, 26d, 27c, 27d can be fixed to front fixed holding member 32 without making holes in front fixed holding member 32 which is a yoke. Moreover, since an extra space for pouring the adhesive at the corners of drive magnet 25c, 25d, 26d, 27c, 27d need not be secured on front fixed holding member 32, drive magnet 25c, 25d, 26d, 27c, 27d can be located along the periphery of front fixed holding member 32. Hence, the actuator can be reduced in size while ensuring a large magnetic force by increasing drive magnet 25c, 25d, 26d, 27c, 27d in size.

(Variations, Etc.)

Although each embodiment has been described above to illustrate the disclosed technology, the disclosed technology is not limited to such. Changes, replacements, additions, omissions, etc. may be made to each embodiment as appropriate, and structural elements described in each embodiment may be combined as a new embodiment.

Other exemplary embodiments will be described below.

[1] Although the foregoing embodiment describes the case where the sectional shape of attraction plate 19 is approximately rectangular, the sectional shape of attraction plate 19 is not limited to such. For example, the sectional shape of attraction plate 19 may be circular, or approximately polygonal.

[2] Although the foregoing embodiment describes the structure of stably attracting imaging element 12 in the direction of optical axis AX in image blur correction device 1, the concept of the present disclosure is not limited to image blur correction device 1. The disclosed technology is also applicable to an imaging device that drives an imaging element in a range smaller than the pixels of the imaging element to obtain image data of higher resolution than the actual number of pixels of the imaging element, as disclosed in, for example, Japanese Unexamined Patent Application Publication No. 2011-227578. The disclosed technology is also applicable to an imaging device that drives an imaging element in units of pixels and obtains information of each color of RGB per pixel to obtain image data of high resolution, as disclosed in, for example, Japanese Unexamined Patent Application Publication No. 2010-73035.

[3] Although the foregoing embodiment describes the case where sensor magnets 22a, 22b, 23a, 23b, 24a, and 24b are located on back fixed holding member 21, this is not a limitation, and sensor magnets 22a, 22b, 23a, 23b, 24a, and 24b may be located on movable frame 11. In this case, magnetic displacement detection sensors 14a, 14b, and 14c and attraction plate 19 are located on back fixed holding member 21.

[4] Although the foregoing embodiment describes digital camera 100 illustrated in FIGS. 1 and 2 as an example of the imaging device, the imaging device is not limited to such. The imaging device may be, for example, any camera system on which an image blur correction device of any of sensor shift type and lens shift type can be mounted.

[5] Although the foregoing embodiment describes the case where the actuator includes drive coils 15, 16, and 17 and six pairs of drive magnets in three sets, the actuator is not limited to such. For example, the actuator may include a piezoelectric actuator.

[6] Although the foregoing embodiment describes the case where each of magnetic displacement detection sensors 14a, 14b, and 14c includes a Hall element, magnetic displacement detection sensors 14a, 14b, and 14c are not limited to such. For example, each of magnetic displacement detection sensors 14a, 14b, and 14c may include a sensor that detects a displacement from an integral value using an angular velocity sensor, an accelerometer, or the like.

The foregoing embodiment has been described to illustrate the disclosed technology, through the detailed description and the accompanying drawings.

The structural elements in the detailed description and the accompanying drawings may include not only the structural elements essential for the solution of the problem but also the structural elements not essential for the solution of the problem, to illustrate the disclosed technology. The inclusion of such optional structural elements in the detailed description and the accompanying drawings therefore does not mean that these optional structural elements are essential structural elements.

The foregoing embodiment is intended to be illustrative of the disclosed technology, and so various changes, replacements, additions, omissions, etc. can be made within the scope of the appended claims and their equivalents.

Although only an embodiment of the present disclosure has been described in detail above, those skilled in the art will readily appreciate that many modifications are possible in the exemplary embodiment without materially departing from the novel teachings and advantages of the present disclosure. Accordingly, all such modifications are intended to be included within the scope of the present disclosure.

INDUSTRIAL APPLICABILITY

The imaging element driving device according to the present disclosure can be widely used in electronic devices (e.g. imaging devices such as digital cameras and camcorders, camera bodies, mobile phones, and smartphones) that have an image blur correction function and a pixel shift photographing function by driving an imaging element and are capable of capturing a subject image.

What is claimed is:

1. An imaging element driving device that drives an imaging element, the imaging element driving device comprising:
 a fixed frame;
 a movable frame that is used to hold the imaging element, faces the fixed frame in an optical axis direction, and is displaceable in a plane orthogonal to the optical axis direction with respect to the fixed frame;
 a magnetic body that is provided on one of the fixed frame and the movable frame; and
 at least one magnet that is provided on an other one of the fixed frame and the movable frame, and faces the magnetic body in the optical axis direction, wherein the at least one magnet has, on a side facing the magnetic body:
an S1 magnetized portion magnetized to an S pole;
an N2 magnetized portion located at a position adjacent to the S1 magnetized portion in a first direction, and magnetized to an N pole;
an S3 magnetized portion located at a position adjacent to the N2 magnetized portion in a second direction intersecting the first direction, and magnetized to the S pole; and
an N4 magnetized portion located at a position adjacent to the S3 magnetized portion in a third direction intersecting the second direction and adjacent to the S1 magnetized portion, and magnetized to the N pole, and
the magnetic body overlaps at least part of the S1 magnetized portion, the N2 magnetized portion, the S3 magnetized portion, and the N4 magnetized portion, when viewed in the optical axis direction.

2. The imaging element driving device according to claim 1,
wherein the at least one magnet further has:
an N1 magnetized portion located on a side opposite to the S1 magnetized portion in the optical axis direction, and magnetized to the N pole;
an S2 magnetized portion located on a side opposite to the N2 magnetized portion in the optical axis direction, and magnetized to the S pole;
an N3 magnetized portion located on a side opposite to the S3 magnetized portion in the optical axis direction, and magnetized to the N pole; and
an S4 magnetized portion located on a side opposite to the N4 magnetized portion in the optical axis direction, and magnetized to the S pole.

3. The imaging element driving device according to claim 1,
wherein the at least one magnet comprises a plurality of magnets, and
the plurality of magnets include:
a first magnet having the S1 magnetized portion;
a second magnet having the N2 magnetized portion;
a third magnet having the S3 magnetized portion; and
a fourth magnet having the N4 magnetized portion.

4. The imaging element driving device according to claim 1, further comprising:
a magnetic displacement detector that detects a displacement of the movable frame with respect to the fixed frame based on a change in magnetic flux of the at least one magnet, is provided on the other one of the fixed frame and the movable frame, and faces the at least one magnet in the optical axis direction.

5. The imaging element driving device according to claim 4, further comprising:
an actuator that displaces the movable frame with respect to the fixed frame,
wherein the magnetic displacement detector detects a displacement amount and a displacement direction of the movable frame with respect to the fixed frame, and
the actuator displaces the movable frame with respect to the fixed frame, based on the displacement amount and the displacement direction of the movable frame detected.

6. The imaging element driving device according to claim 4, wherein the movable frame, the magnetic displacement detector, the magnetic body, and the at least one magnet are arranged in the stated order along the optical axis direction.

7. The imaging element driving device according to claim 1, further comprising:

a support ball member that supports the movable frame to be displaceable with respect to the fixed frame,
wherein the support ball member is pressed against the movable frame or the fixed frame, as a result of the magnetic body being attracted to the at least one magnet.

8. The imaging element driving device according to claim 1,
wherein in a state in which the movable frame is not displaced with respect to the fixed frame, the magnetic body is located with a center thereof being aligned with an intermediate point of the S1 magnetized portion, the N2 magnetized portion, the S3 magnetized portion, and the N4 magnetized portion along the optical axis direction.

9. The imaging element driving device according to claim 1,
wherein a section of the magnetic body perpendicular to the optical axis direction has a circular shape or an approximately polygonal shape.

10. The imaging element driving device according to claim 1, further comprising:
a position regulation member that regulates movement of the movable frame with respect to the fixed frame, wherein
the position regulation member is located such that the position regulation member contacts a center of gravity of the movable frame in an optical axis direction when the movable frame contacts the position regulation member, and
wherein the position regulation member operates to suppress noise generated during movement of the movable frame.

11. An imaging device comprising:
the imaging element driving device according to claim 1; and
an imaging element that converts an optical image of a subject into an electric signal,
wherein the movable frame of the imaging element driving device holds the imaging element to be displaceable with respect to the fixed frame of the imaging element driving device.

12. An imaging device comprising:
the imaging element driving device according to claim 1; and
a plurality of optical systems that condense light from a subject,
wherein the movable frame of the imaging element driving device holds at least one of the plurality of optical systems to be displaceable with respect to the fixed frame of the imaging element driving device.

13. An imaging element driving device that drives an imaging element, the imaging element driving device comprising:
a yoke having a fixed surface; and
a magnet that is used to drive the imaging element, located along a periphery of the yoke, and fixed to the fixed surface of the yoke with an adhesive, wherein
a whole back surface of the magnet includes a pole of the magnet and is in contact with the fixed surface of the yoke through the adhesive,
the magnet includes a side surface that is approximately perpendicular to the back surface of the magnet and the fixed surface, and
the side surface is flush with a peripheral surface of the yoke and the side surface is exposed to an outside along the periphery of the yoke.

14. The imaging element driving device according to claim 13,
wherein the magnet comprises a plurality of magnets,
the plurality of magnets are arranged adjacent to each other on the fixed surface of the yoke, and
a side surface of each of the plurality of magnets approximately perpendicular to the fixed surface is exposed to an outside along the periphery of the yoke, except a side surface facing another magnet adjacent to the magnet.

15. The imaging element driving device according to claim 13,
wherein the yoke comprises a pair of yokes and the magnet comprises a pair of magnets,
the pair of magnets are fixed to fixed surfaces of the pair of yokes respectively,
the fixed surfaces of the pair of yokes face each other, and
the pair of magnets overlap each other in a plan view.

16. The imaging element driving device according to claim 13, wherein an area of the yoke in a plan view is larger than an area of the magnet in a plan view.

\* \* \* \* \*